US008624978B2

(12) United States Patent \
Miyamaki

(10) Patent No.: US 8,624,978 B2 \
(45) Date of Patent: Jan. 7, 2014

(54) NETWORK CAMERA MANAGEMENT SYSTEM AND NETWORK CAMERA MANAGEMENT METHOD

(75) Inventor: Hideo Miyamaki, Shanghai (CN)

(73) Assignee: Sony Corporation, Tokyo (JP)

( * ) Notice: Subject to any disclaimer, the term of this patent is extended or adjusted under 35 U.S.C. 154(b) by 988 days.

(21) Appl. No.: 12/466,059

(22) Filed: May 14, 2009

(65) Prior Publication Data

US 2009/0295925 A1 Dec. 3, 2009

(30) Foreign Application Priority Data

May 30, 2008 (CN) .......................... 2008 1 0098349

(51) Int. Cl.
*H04N 7/18* (2006.01)
*G08B 21/00* (2006.01)

(52) U.S. Cl.
USPC .......................................... 348/159; 340/540

(58) Field of Classification Search
USPC .......................................... 348/159; 340/540
See application file for complete search history.

(56) References Cited

U.S. PATENT DOCUMENTS

| 6,122,005 | A * | 9/2000 | Sasaki et al. ............... 348/211.3 |
| 7,403,116 | B2 * | 7/2008 | Bittner ........................... 340/540 |
| 2006/0284981 | A1 * | 12/2006 | Erol et al. .................. 348/207.1 |
| 2008/0247457 | A1 * | 10/2008 | Cromwell et al. ....... 375/240.01 |
| 2009/0278934 | A1 * | 11/2009 | Ecker et al. .................... 348/152 |
| 2010/0321183 | A1 * | 12/2010 | Donovan et al. .............. 340/540 |

FOREIGN PATENT DOCUMENTS

JP 2004-128623 4/2004

OTHER PUBLICATIONS

Atherton, T.J.; Kerbyson, D.J., "Reducing false alarm rates in surveillance imaging using significance testing," Image Processing for Security Applications (Digest No. 1997/074), IEE Colloquium on , vol., no., pp. 7/1,7/4, Mar 10, 1997.*
Bal, A.; Alam, M.S., "Automatic target tracking in FLIR image sequences using intensity variation function and template modeling," Instrumentation and Measurement, IEEE Transactions on , vol. 54, No. 5, pp. 1846,1852, Oct. 2005.*

* cited by examiner

*Primary Examiner* — Lynn Field \
*Assistant Examiner* — Taylor Elfervig \
(74) *Attorney, Agent, or Firm* — Oblon, Spivak, McClelland, Maier & Neustadt, L.L.P.

(57) ABSTRACT

The present invention is intended to manage a plurality of network cameras simply. The network camera management system comprises: a server for managing a plurality of cameras and controlling recording and/or displaying of an image captured by a camera; and a controller for instructing a management state of a camera on the server. By the operation of the controller, an image to be displayed is dynamically selected from images captured by the plurality of cameras according to the mode instructed by the controller. Thus, even if there are a large number of cameras, it is possible to display in such a form that it is intuitively easy to understand which camera's image is being displayed.

8 Claims, 22 Drawing Sheets

NETWORK CAMERA MANAGEMENT SYSTEM AND NETWORK CAMERA MANAGEMENT METHOD

BACKGROUND OF THE INVENTION

1. Field of the Invention

The present invention relates to a network camera management system and a network camera management method for managing a camera connected to a network.

2. Description of the Related Art

Various network cameras which can be connected to a so-called IP network communicating under an IP protocol have been developed as video cameras such as a monitoring camera. Such network cameras connected to the IP network respectively have an IP address and are managed by the IP address thereof.

When such network camera is connected to the IP network, it is managed by a server connected to the network, and images captured by the network camera are displayed on a display unit provided in the server, and are recorded in a recording unit.

Generally, there are a plurality of cameras while connecting the cameras to the network, but in the case of a large-scale monitoring camera system, sometimes there are also a plurality of servers.

In order to view an image of a desired camera in a monitoring camera system provided with a plurality of cameras, it is necessary for a surveillant to create a layout in which IP cameras are assigned beforehand, and then locate the desired camera from the layout, or select a server managing the desired camera before selecting the camera on the supervision screen acquired by the server.

Patent documents 1 (Japanese Patent Laid-Open No. 2004-128623) discloses an example of a structure in which a plurality of cameras are connected to a server via a network and remote surveillance is performed.

However, in the case of a large-scale camera system provided with a plurality of servers, it is necessary to select the server, and the operation is complex, and therefore there exists a problem that it takes a long time to select the image captured by a desired camera. Even if there is only one server, if there are a plurality of cameras, the operation to locate the desired camera is complex.

There is also a system provided with a special controller connected to the server, however a system using a conventional special controller also has a problem that an operation of selecting a camera is very difficult.

SUMMARY OF THE INVENTION

The present invention has been developed in view of the foregoing circumstances, and is intended to manage a plurality of network cameras simply.

The present invention is applicable when managing a plurality of cameras connected to a predetermined network.

The present invention comprises a server for managing a plurality of cameras and controlling recording and/or displaying of an image captured by a camera, and a controller for instructing a management state of a camera on the server.

In addition, by the operation of the controller, an image to be displayed can be dynamically selected from images captured by a plurality of cameras according to the mode instructed by the controller.

According to the present invention, by the operation of the controller, an image to be displayed can be dynamically selected from the images captured by a plurality of cameras according to the mode instructed by the controller, and thus even if there are a large number of cameras in a system, it is possible to display an image easy to be understood by an operator.

According to the present invention, while assigning cameras for displaying and recording, it is possible to display appropriately in response to a mode set by a controller and the like at that time, and ever if there are a large number of cameras connected to the network, it may be easy to reach a desired camera which is a camera for displaying and recording an image, and the operability of such system can be improved.

DETAILED DESCRIPTION OF THE INVENTION

Hereinafter, an embodiment of the present invention will be described in detail with reference to the attached drawings.

Figure 1:
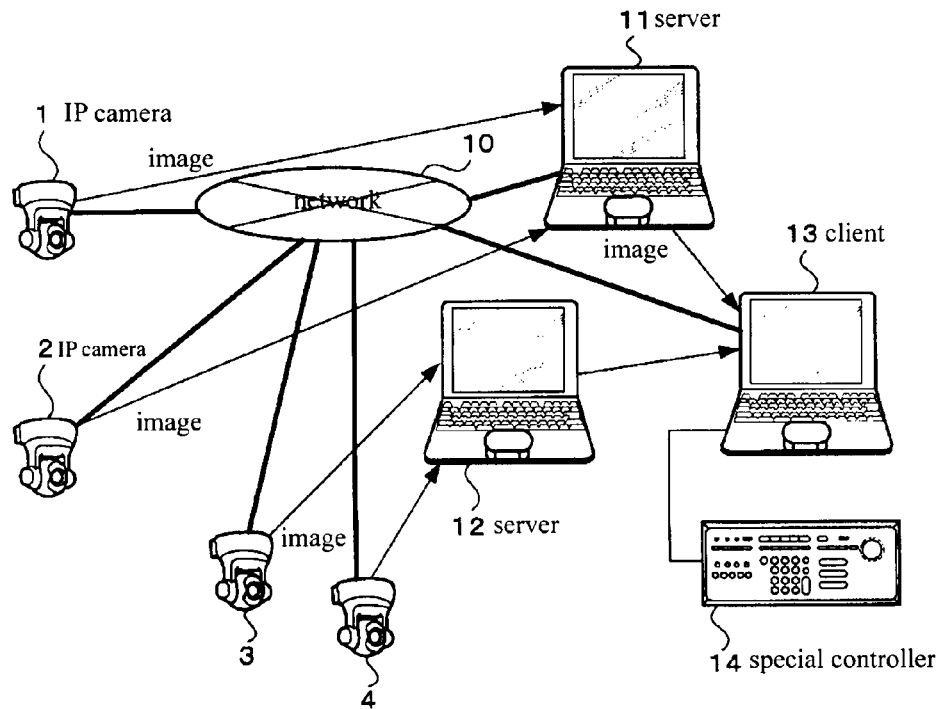
FIG. 1 is a structural view showing a structural example of a system according to an embodiment of the present invention.

FIG. 1 is a view showing a structural example of a system according to the present embodiment. In the present embodiment, network cameras 1, 2, 3, 4 ... which are video cameras capable of being connected to a network for transmitting data under an IP (Internet Protocol) protocol are prepared. The network cameras 1, 2, 3, 4 ..., for example, are used as monitoring cameras. In the following description, the network cameras 1, 2, 3, 4 ... are referred to as IP cameras. Only four cameras are shown in FIG. 1 for the sake of facilitating the description, but in reality, a structure connected with several dozens of cameras or more can be assumed.

A network 10 to which IP cameras 1, 2, 3, 4 ... are connected may use a network established exclusively for the camera system, or common networks such as internet.

A plurality of servers 11, 12 and a client 13 are connected to the network 10. The servers 11, 12 and the client 13 are composed of a computer apparatus which can be connected to the network, and a display provided in the computer apparatus thereof is used as a displaying unit for displaying an image and the like.

Each of the servers 11, 12 determines IP cameras managed thereby among IP cameras connected to the network 10, and management is executed respectively by two servers 11, 12. An image captured by an IP camera is transmitted via the network 10 to a server which manages the IP camera.

The servers 11, 12, upon receiving an image transmitted from an IP camera, analyze the image and perform determination process of the monitoring state. For example, the servers 11, 12 determine whether there is an intruder. Then, the acquired image is stored in a storage unit provided in the servers 11, 12. Large capacity storage means such as a hard disk can be used as the storage unit.

The client 13 is used for browsing an image of each of the IP cameras 1, 2 .... The client 13 assigns the global number which is a static number of a camera network. A special controller 14 for controlling the servers 11, 12 and each of the IP cameras 1, 2 ... is connected to the client. The special controller 14 includes operation units such as a number input key, a camera selection button, a joy stick and the like for controlling the servers 11, 12 and each of the IP cameras 1, 2 .... Then, a display of a computer apparatus composing the client 13 or other display means performs displaying based on an operation of the operation unit of the special controller. It is also feasible to perform the same operation by operating a keyboard provided in the computer apparatus composing the client 13 instead of the special controller 14.

Figure 2:
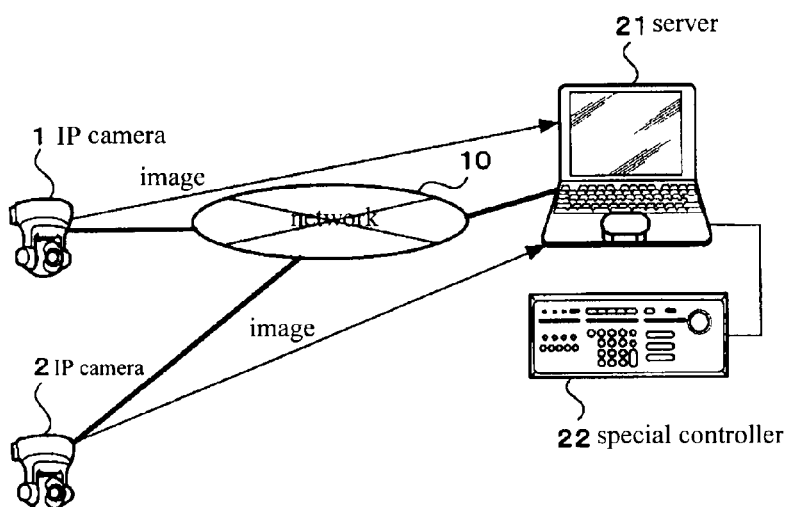
FIG. 2 is a structural view showing a structural example (wherein there is one server) of a system according to an embodiment of the present invention.

FIG. 2 is another structural example of the system. As illustrated in FIG. 2, a server 21 is connected to the network 10 to which a plurality of IP cameras 1, 2 ... are connected, a special controller 22 is connected to the server 21. In the example, the server 21 manages all the cameras and is provided with the functions of the servers 11, 12 and the client 13 in FIG. 1. The special controller 22 has the same structure as the special controller 14 in FIG. 1.

Figure 3:
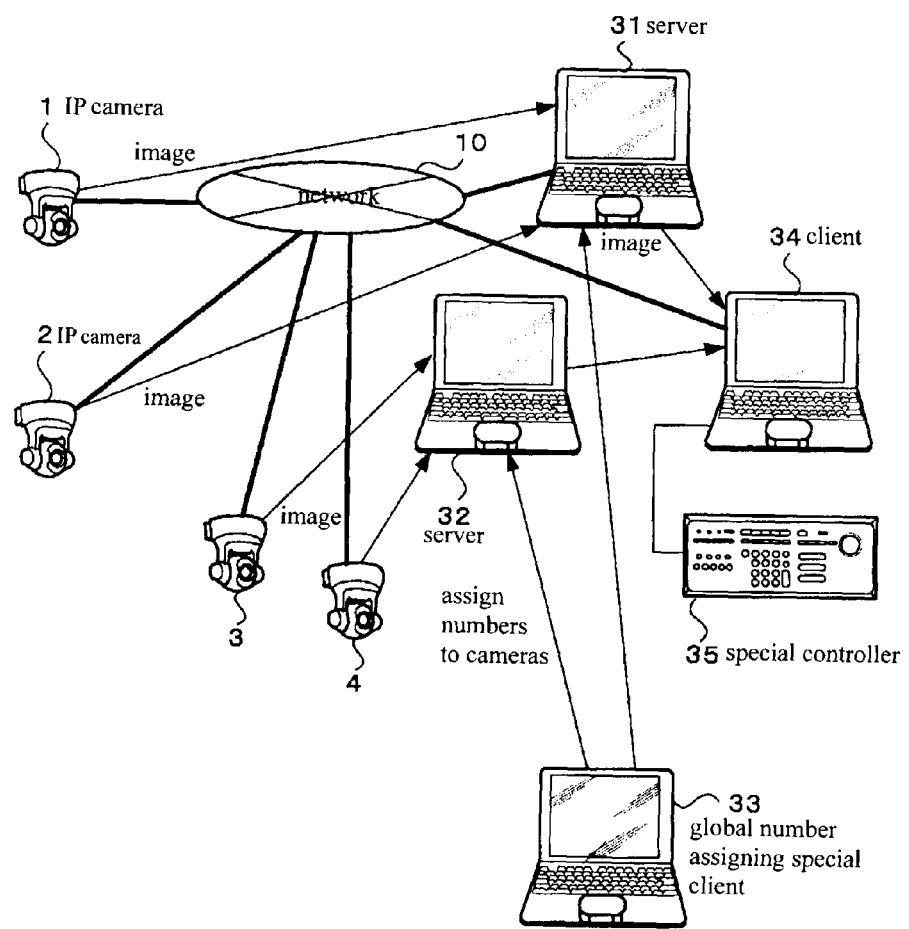
FIG. 3 is a structural view showing a structural example (wherein a client for assigning numbers is provided) of a system according to an embodiment of the present invention.

FIG. 3 is yet another structural example of the system. In the example shown in FIG. 3, a plurality of servers 31, 32 are connected to the network 10 to which a plurality of IP cameras 1, 2 ... are connected, and the plurality of IP cameras 1, 2 ... are managed respectively by each of the servers 31, 32, which is the same with the structural example of FIG. 1.

A global number assigning special client 33 and a common client 34 are provided as clients, and the client 34 is connected with the special controller 35. The global number assigning special client 33 allocates and manages global numbers, i.e. static numbers of all IP cameras 1, 2 ..., which compose the present system and are connected to the network 10, on the network. The global numbers, for example, are numbers that an operator can allocate to the plurality of IP cameras 1, 2 ... in a discretionary order by an operation using the special controller 35. Hence, even if the servers for respectively managing the cameras 1, 2 ... extend to a plurality of servers, the operator can allocate continuous numbers in a specified order. In addition, it is unnecessary to allocate global numbers to all the plurality of IP cameras prepared in the system according to the present example, and only IP cameras instructed by an operation of the operator have global numbers. The client 34 performs processes of client functions except for address management.

Besides, examples of FIG. 1, FIG. 2 and FIG. 3 each are a structural example of the system, and a system, in which not only the number of cameras, but also that of servers and clients, may be any number other than the number shown in the figures, can be established. The server does not always have the functions as a server, and it can be a stand-alone terminal. Moreover, the network 10 may be a network other than an IP network.

Figure 4:
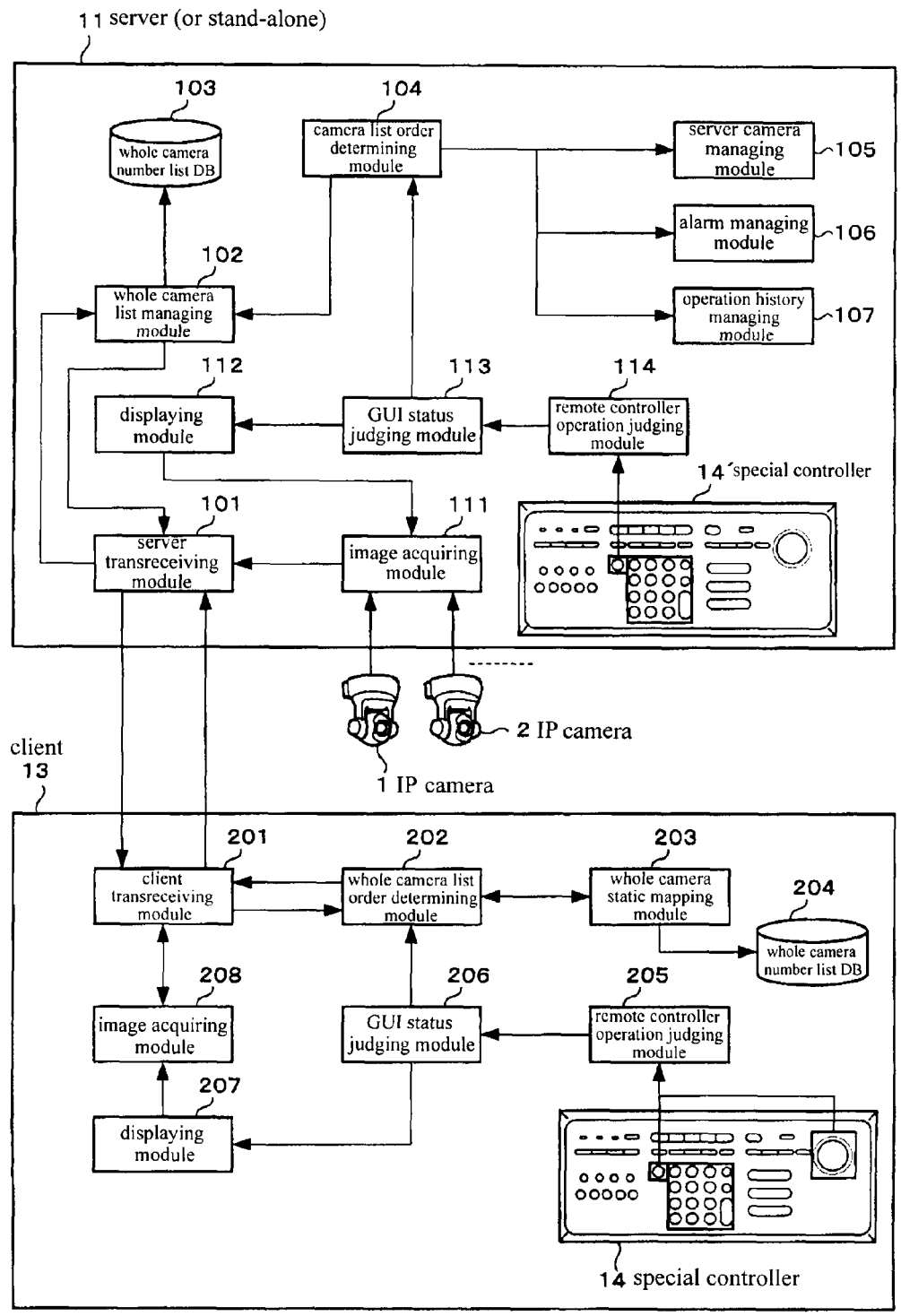
FIG. 4 is a block diagram showing a structural example of a server and a client according to an embodiment of the present invention in detail.

FIG. 4 is a view showing the inner structure of the server 11 and the client 13 in FIG. 1. The server 11 and the client 13 in FIG. 1 are to be described herein as an example, but other servers or clients may also have substantially the same structure. As illustrated in FIG. 4, the client 13 is connected with the special controller 14, and the server 11 side is also connected with an identical special controller 14'. Moreover, each of the modules herein may be provided with a processing unit performing their respective process, but the modules may be virtually configured by executing software installed to the server or client.

The server 11 includes a server transreceiving module 101, and transmits data to and receives data from other devices connected to the network 10. The server transreceiving module 101 transmits a list of IP cameras managed by the server or a list of all IP cameras to the client side. A camera image acquired by the server 11 is also transmitted by the server transreceiving module 101. The server 11 includes an image acquiring module 111 in addition to the server transreceiving module 101, and image data from IP cameras 1, 2 ... managed by the server is acquired by the image acquiring module 111. The image data may be either image data continuously obtained as dynamic images or image data of static images obtained at a certain interval.

The server 11 includes a whole camera number list managing module 102, and acquires a whole camera number list provided in the present system from the client 13 side. The whole camera number list managing module 102 is connected with a whole camera number list database 103, and stores the acquired whole camera number list. The whole camera number list stored in the database 103 is stored with global number and local number of each IP camera as well as management information such as the number of unconfirmed alarms and operation history.

Moreover, the server 11 includes a camera list order determining module 104, a server camera managing module 105, an alarm managing module 106 and an operation history managing module 107, and performs corresponding management by each of the modules.

The camera list order determining module 104 is a module that manages a number list of IP cameras registered in the server 11, and can map the local number with the global number. Furthermore, the camera list order determining module 104 can manage the number of unconfirmed alarms and operation history of each of the IP cameras registered in the server 11 as well.

The server camera managing module 105 stores data necessary for managing by the camera list order determining module 104 and transmits the data to the camera list order determining module 104.

The alarm managing module 106 is a module that manages the number of unconfirmed alarms of each of the IP cameras managed by the server 11. When alarm information is transmitted from a camera, management process is performed in the alarm managing module 106 such that an unconfirmed state about alarm information of the camera is stored. The alarm information herein is information generated when abnormality such as an intruder is detected from an image captured by a sensor provided in a camera or a camera. Alarm information being unconfirmed indicates, for example, a state that an image from a camera in which the alarm occurs is not displayed.

The operation history management module 107 is a module that manages the number of operation history for each of the IP cameras managed by the server 11. The operation history management module 107 stores operation histories such as an operation of selecting and displaying an image from a camera, an operation of instructing an angular field of view, etc. of the camera with regard to past operations of a predetermined number or past operations during a predetermined time.

Data from the special controller 14' is judged by a remote controller operation judging module 114, and it is judged that which key of the special controller 14' is pressed.

A GUI status judging module 113 judges which IP camera is selected by the controller by grasping operation information of the controller 14 or 14', IP camera list management information, current screen status and so on. A displaying module 112 displays a screen of the judged result which instructs the selection.

The client 13 includes a client transreceiving module 201, and transmits data to and receives data from a server. The client transreceiving module 201 can transreceive a unique global camera number and receive an image from the server. In FIG. 4, the client transreceiving module 201 is configured to transmit data to and receive data from the server 11, but it can communicate with all servers in the system.

Moreover, the client 13 includes a whole camera list order determining module 202, a whole camera static mapping module 203 and a whole camera number list database 204.

The whole camera static mapping module 203 is a module which can assign a unique number to IP cameras of all servers registered in the management client by a manual operation. For example, when a user operates on the client, special global numbers (101~999) are assigned to all IP cameras. During the operation on the server, each of the IP cameras can be accessed to by either its global number or its local number assigned in the range of 1 to 99. The whole camera static mapping module 203 is connected with the whole camera number list database 204.

The whole camera list order determining module 202 is a module that determines a number order of all IP cameras based on information of each of the IP cameras received from each server and information of the whole camera static mapping module 203.

Moreover, the client 13 includes a remote controller operation judging module 205, a GUI status judging module 206, a displaying module 207 and an image acquiring module 208.

The remote controller operation judging module 205 judges an operation in the special controller 14. The GUI status judging module 206 judges the GUI status on the basis of the judgment of the operation in the special controller 14 and a current display state in the displaying module 207.

The displaying module 207 controls a display on the client 13 and the like, and selects a camera image acquired by the image acquiring module 208 and the like.

Figure 7:
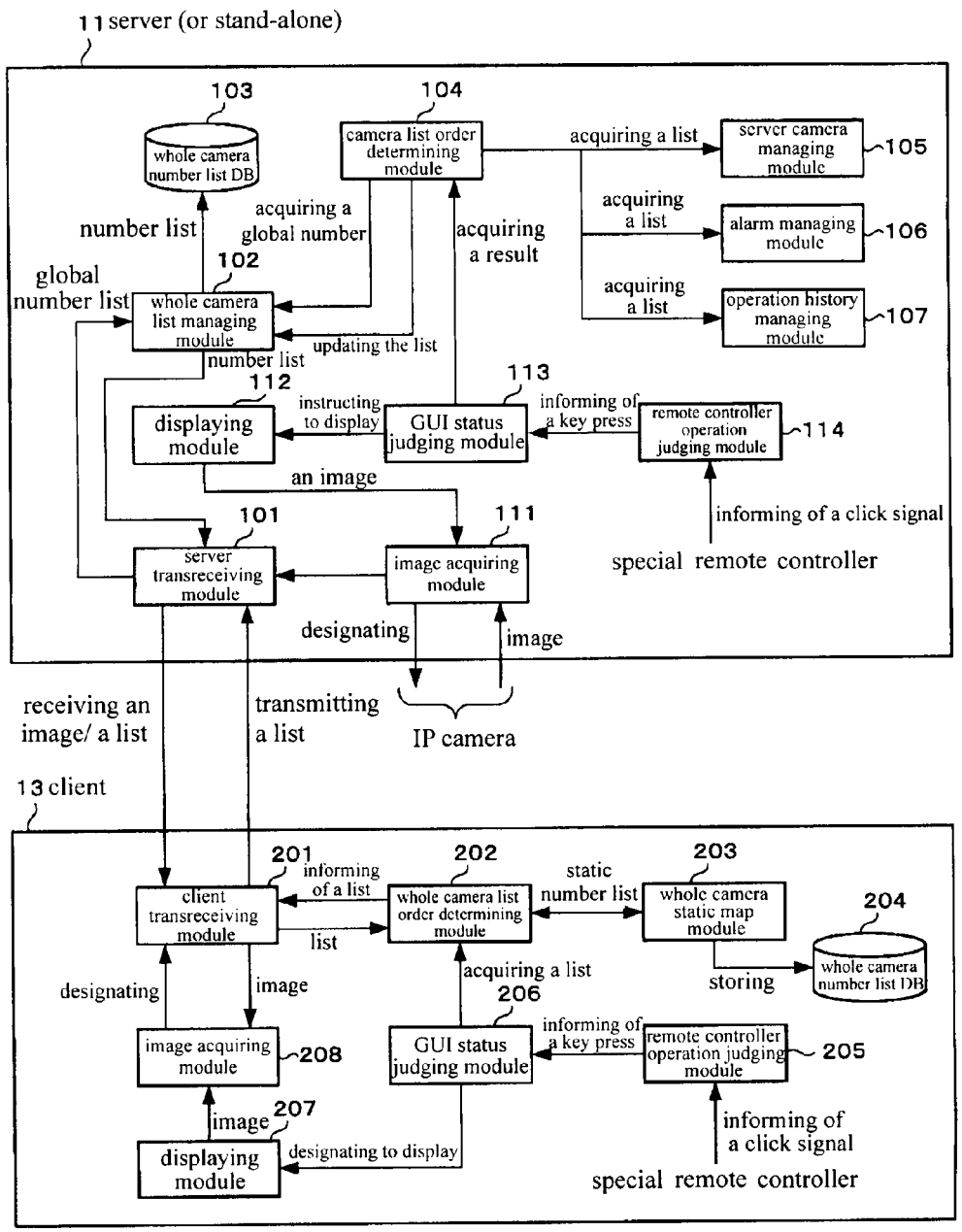
FIG. 7 is a block diagram illustrating an example of data between the server and the client according to an embodiment of the present invention.

In addition, FIG. 7 shows flows of various data and images in the server 11 and the client 13 described hereinabove. As shown in FIG. 7, an instruction, a notice and the like from each module are performed, and a process is executed based on a notice received by a side which receives the instruction.

Figure 5:
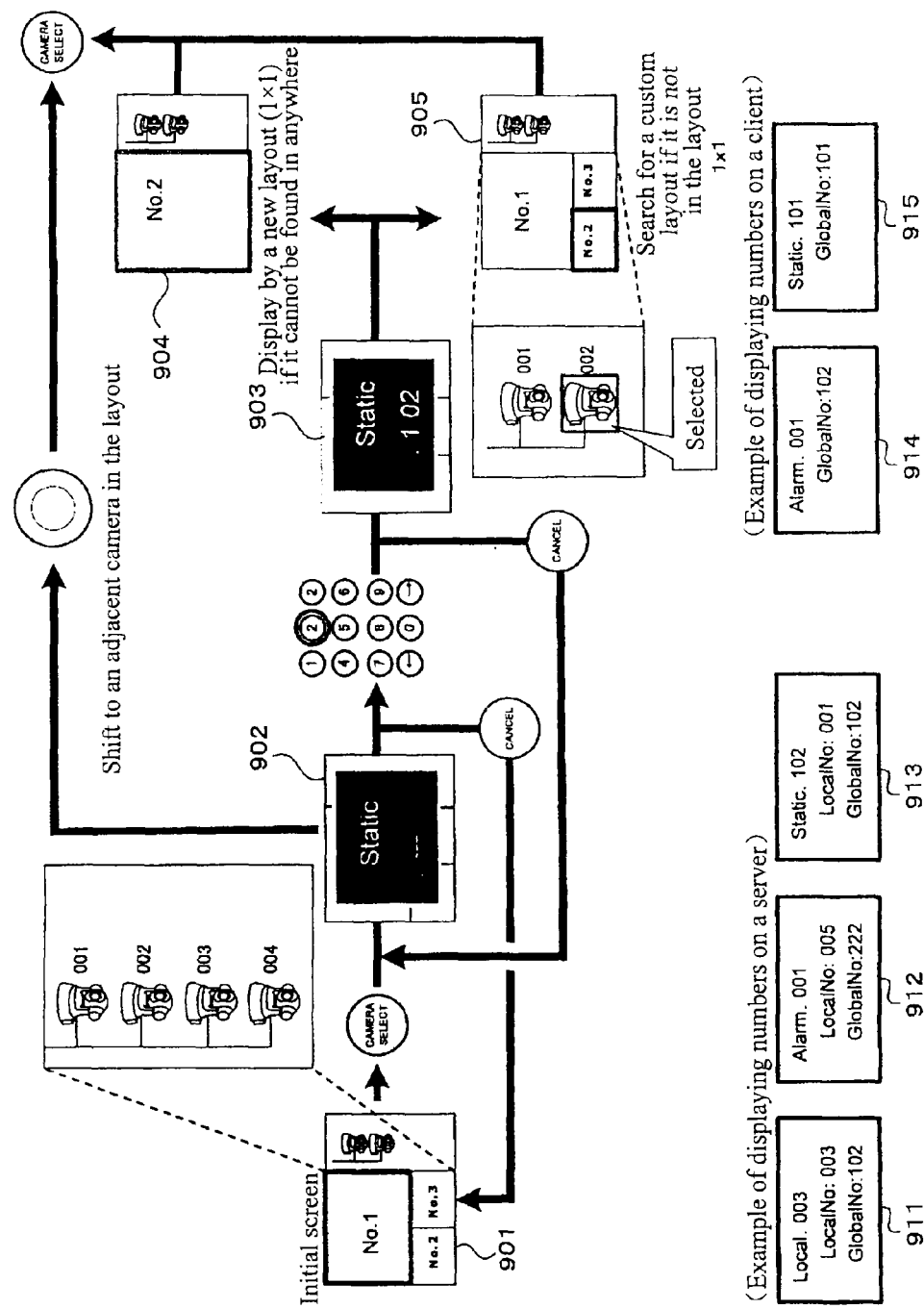
FIG. 5 is an explanation diagram illustrating a summary of display change according to an embodiment of the present invention.

FIG. 5 is a view illustrating a process example of selecting a camera number performed by an operation on the client side in the present system by using a change of the display screen. As described above, each of the IP cameras has a global number which is an address on the network, and a local number different from the global number. The local number is a number which can be set freely by an operation of an operator. FIG. 5 shows a setting screen of the local number.

According to FIG. 5, firstly, in the initial screen 901, an image of the IP camera selected to display is displayed while a list of the local numbers is being displayed on the right corner. Images of three cameras, i.e. No. 1, No. 2, and No. 3, are displayed on the screen 901. Wherein, the image of the camera No. 1 is displayed as an enlarged image, while the images of other cameras are displayed as reduced images.

If a camera selection button of the special controller 14 is pressed in a state of displaying the screen 901, the screen will become a selecting screen 902 of the camera number. If a cancel button of the special controller 14 is pressed in a state of displaying the selecting screen 902, it will return to the previous screen 901.

If a camera number of two-digits or three-digits is input by using the number key in a state of displaying the selecting screen 902, it will become a screen 903 displaying the input global number. Then, if there is a selection by which local number is to be assigned to an IP camera with the global number, it will become a screen 904 or 905 displaying an image of a camera corresponding to the selected local number. Two display forms 904, 905 are chosen according to whether the selected camera is present in a display layout, or is absent in the display layout. And later, the allocation of the local number is determined by operating the camera selection button of the special controller 14. Or else, cameras displayed on the initial screen are orderly selected for a number not to be input in a state of displaying the screen 902.

As shown in the lower side of FIG. 5, global numbers and local numbers are displayed on the display screen of a server side and on the display screen of a client side as a display of information of each camera by performing these selections such as number allocation operations. Besides, it is also displayed at the same time that whether there is an alarm or the like.

As a display in the displaying unit of the server, for example, by selecting a local number for a specified IP camera, its local number and global number will be displayed in order on a display screen 911.

In addition, when a camera in which an alarm occurs is selected on the server side, a local number and a global number of the camera in which an alarm occurs will be displayed in order on a display screen 912.

Moreover, when a static number is selected on the server side, a local number and a global number of an IP camera with the static number will be displayed in order on a display screen 913.

As a display in the displaying unit of the client, for example, when a camera in which an alarm occurs is selected, a global number of the camera in which an alarm occurs will be displayed on a display screen 914.

In addition, when a static camera number in the displaying unit of the client is selected and displayed, a global number of the camera will be displayed on a display screen 915.

These display forms are performed based on a mode set by the special controller 14 and the like.

That is, when a display mode of a global number order is set as the mode, images of cameras, numbers of the cameras, and the like will be displayed in an order of a global number list of each server.

When an alarm mode is set, images of cameras, numbers of the cameras and the like will be displayed based on a list of cameras having unconfirmed alarm history, which is generated by the alarm managing module 106 of each server, in the list order. The list order herein may be either displaying orderly from an earliest unconfirmed alarm, or displaying orderly from a latest unconfirmed alarm.

When an operation history (operation mode) is set, images of cameras, numbers of the cameras and the like are displayed, in accordance with a list of cameras having operation history, in the list order, on the basis of information of the operation history managing module 107 and the like of each server. The list order herein may be either displaying orderly from an earliest operation history remaining in a record, or displaying orderly from a latest operation history remaining in the record.

Besides, although a mode of displaying camera images is set herein, recording of the camera images on a server or a client may be performed together according to these mode settings. Or else, a mode for displaying camera images and a mode for recording may be separated with each other.

As illustrated in FIG. 5, local numbers to be allocated to cameras of each server are orderly allocated from No. 1, and global numbers to be allocated to cameras of each server are orderly allocated from No. 101. When there are 100 or less IP cameras in the whole system, the local numbers and the global numbers will not overlap. However, the local numbers and the global numbers may be respectively composed of numbers starting with an identical number such as No. 1.

Figure 6:
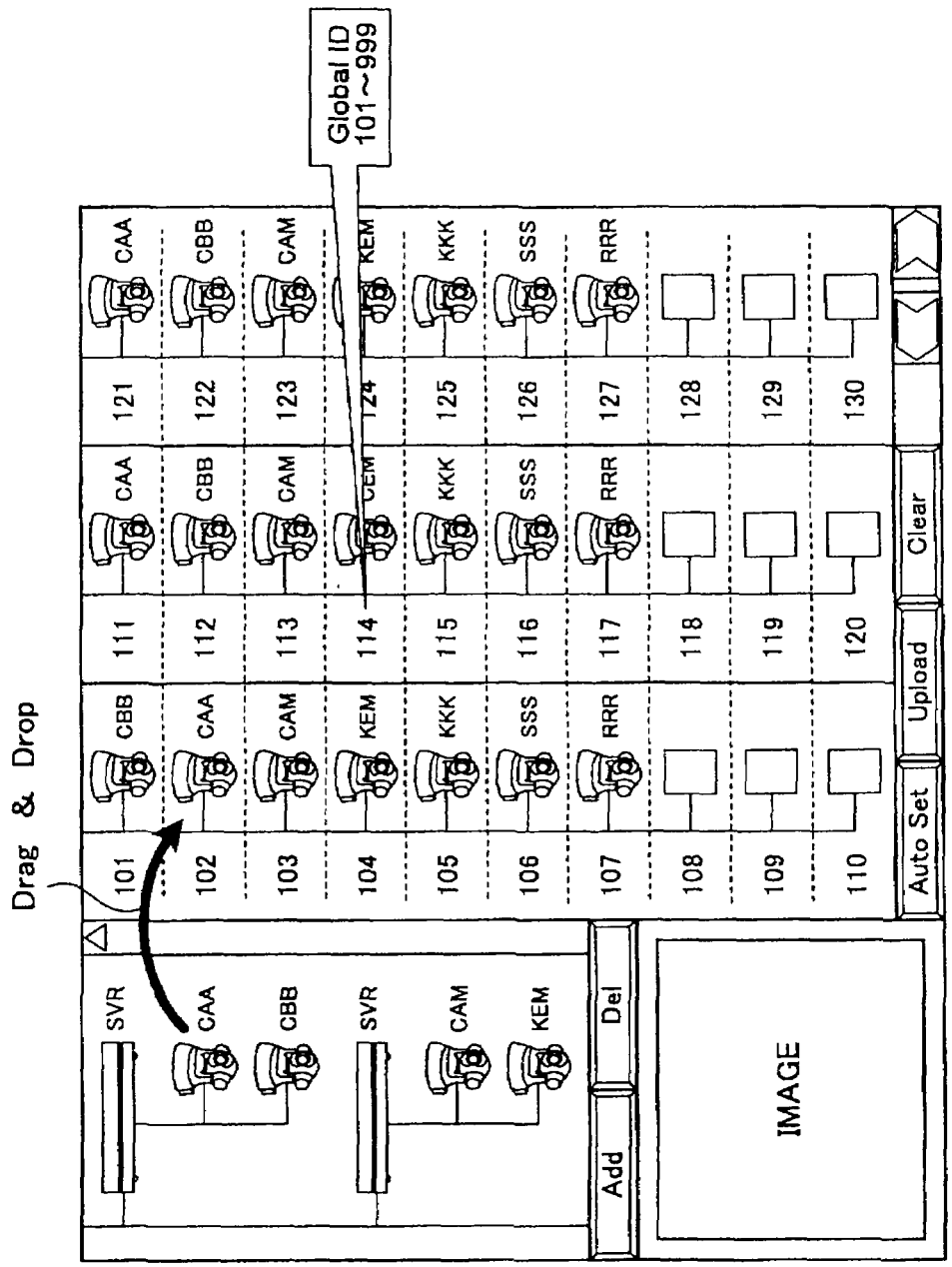
FIG. 6 is an explanation diagram illustrating a displaying example according to an embodiment of the present invention.

FIG. 6 is an example of displaying a static mapping of all cameras by a process in the static mapping module 203 of the client. As shown in FIG. 6, a list of global IDs of all cameras in the system is displayed, and cameras assigned to each server are displayed at the left corner. A local number can be assigned to a global number manually by performing a GUI operation, for designating displaying a list of the global IDs, with a drag and drop operation using operation means (a pointer) such as a mouse connected to the controller 14 performed on any one of the cameras on the screen in such state. After the assignment, image and information of IP cameras can be accessed to from the client by either the local number or the global number.

Hereinafter, an action example in each of the modules of the server and the client will be described with reference to flowcharts of FIG. 8 and figures thereafter.

Figure 8:
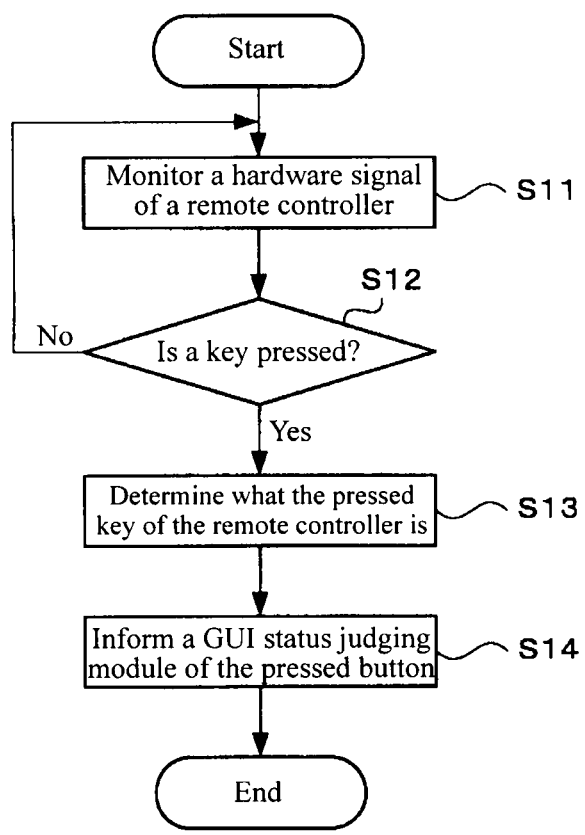
FIG. 8 is a flowchart illustrating a process example in a remote controller operation judging module according to an embodiment of the present invention.

FIG. 8 is a view showing an action of an operation judgment of the special controller 14 or 14' by the remote controller operation judging module 114 of the server and the remote controller operation judging module 205 of the client.

Firstly, monitor a hardware signal of a controller (step S11), and judge whether a key of the controller is pressed (step S12). If the key is not pressed, return to the judgment of step S11, and stand by until the key is pressed. If it is judged that the key is pressed by the judgment of step S12, determine what the pressed key (button) is (step S13), and inform the GUI status judging module of information of the pressed button (step S14).

Figure 9:
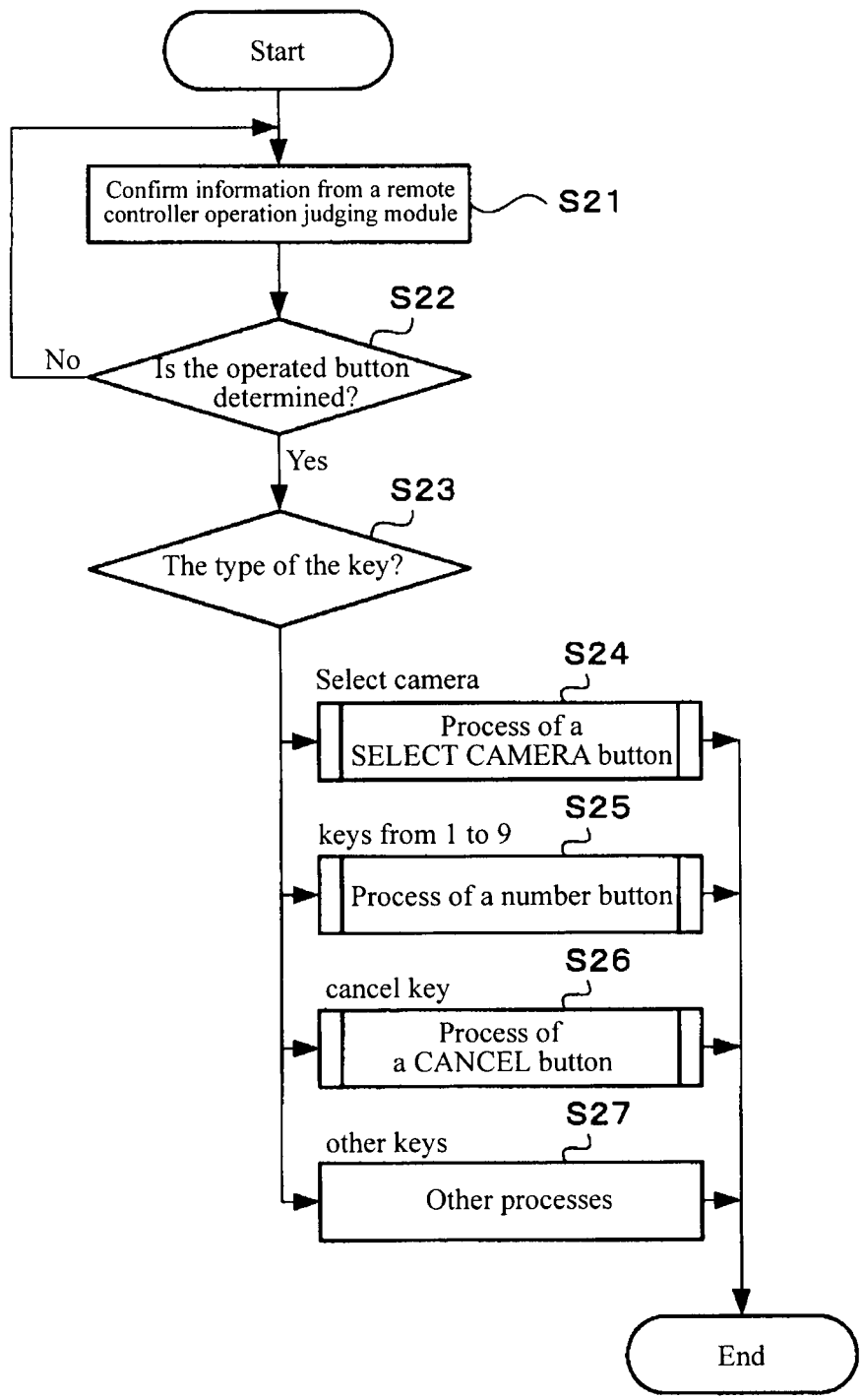
FIG. 9 is a flowchart illustrating a process example corresponding to the type of a key in a GUI status judging module according to an embodiment of the present invention.

FIG. 9 is a view showing a process action in the GUI status judging modules 113 and 206.

If information from the remote controller operation judging module is confirmed in the GUI status judging module (step S21), it is judged whether the type of the operated button (key) can be determined from the information (step S22), and return to step S21 if it fails to determine. If the type of the operated button (key) can be determined, a process corresponding to the type of the key is performed (step S23).

For example, if a camera selection button is pressed, the camera selection process is performed (step S24). And if a number button is pressed, an input process of the pressed number is performed (step S25). Moreover, if a cancel button is pressed, a process canceling the present operation is performed (step S26). Furthermore, if other buttons are pressed, a process corresponding to each of the buttons is performed.

Figure 10:
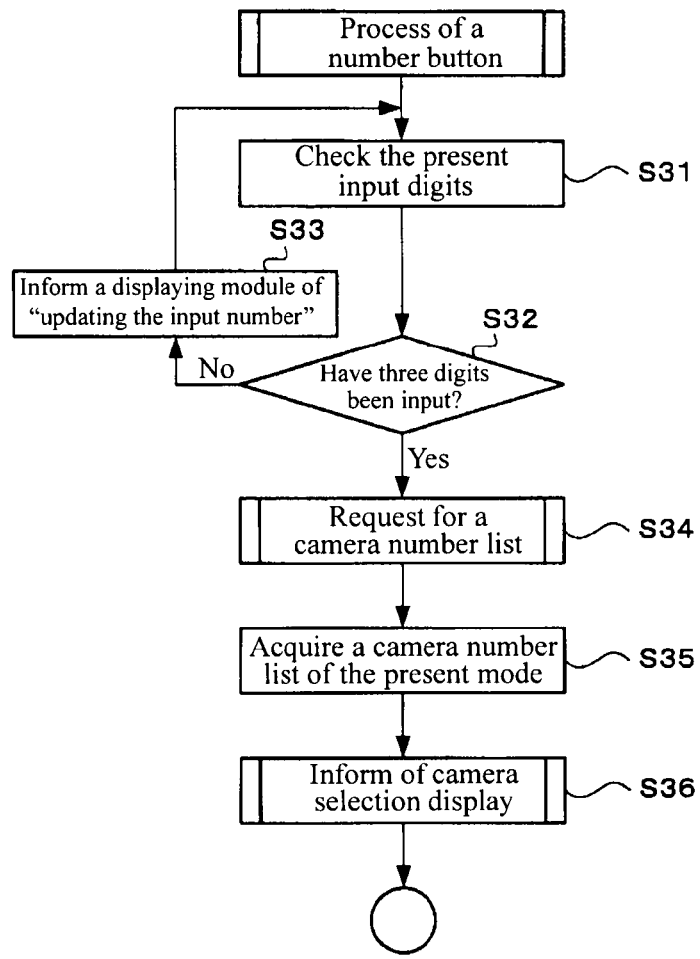
FIG. 10 is a flowchart illustrating a process example of operating a number button according to an embodiment of the present invention.

FIG. 10 is a view illustrating a process example in the case of pressing a number button of the special controller.

When the number button is pressed, check the present input digits (step S31), and judge whether the highest digit of the camera number, i.e. the hundredth digit, has been input (step S32). If the hundredth digit has not been input, inform the displaying module of "updating the input number" (step S33), and check the present input digits in step S31.

If it is judged in step S32 that the number of three-digits has been input, request a camera number list (step S34), acquire the camera number list of the present mode (step S35), and inform of camera selection display (step S36).

Figure 11:
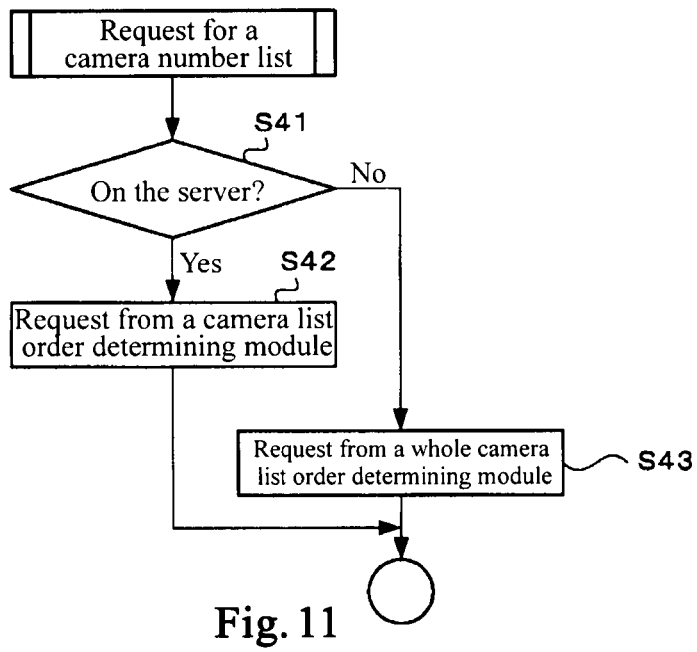
FIG. 11 is a flowchart illustrating a process example of requesting a camera number list according to an embodiment of the present invention.

As shown in FIG. 11, as a process for requesting a camera number list, judge whether the request for a camera number list is on a server (step S41), and if the request is on the server, request from the camera list order determining module (step S42). If the request is not on the server, request from the whole camera list order determining module (step S43).

Figure 12:
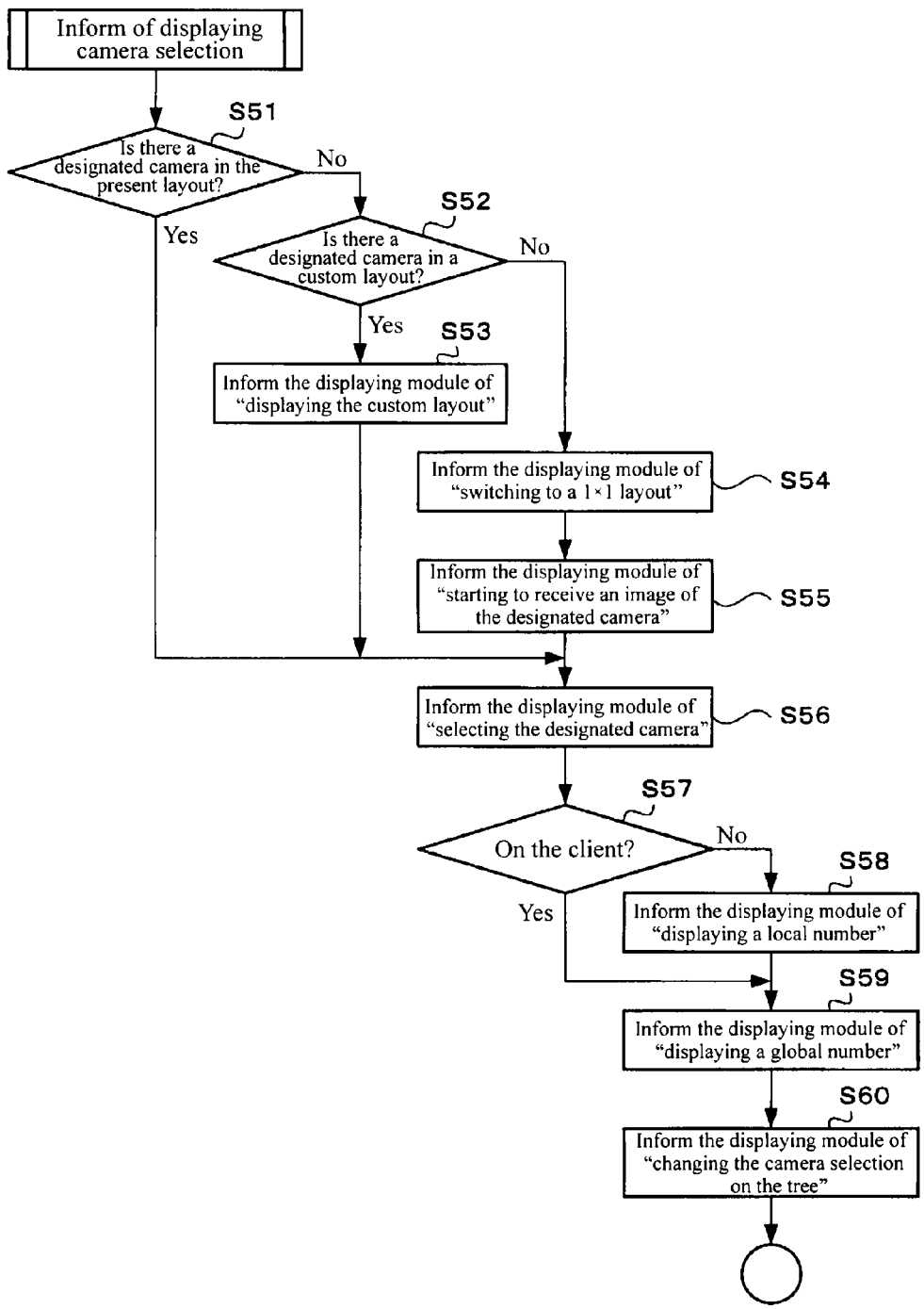
FIG. 12 is a flowchart illustrating a process example of informing of camera selection display according to an embodiment of the present invention.

FIG. 12 is a view illustrating a process example of informing of camera selection display of step S36 in FIG. 10.

As the process for informing of camera selection display, it is judged whether the designated camera is in the present display layout (step S51). If the camera is not in it, it is judged whether the designated camera is in a custom layout (step S52). If the designated camera is in the custom layout, the displaying module is informed of "displaying the custom layout" (step S53). If the designated camera is not in the custom layout, the displaying module is informed of "switching to a 1×1 layout" (step S54) and "starting to receive an image of the designated camera" (step S55).

Then, inform the displaying module of "selecting the designated camera", and judge whether the selection is on a client (step S57), and if it is not on the client, inform the displaying module of "displaying a local number" (step S58).

And then, inform the displaying module of "displaying a global number" (step S59), and inform the displaying module of "changing the camera selection on the tree" (step S60).

Figure 13:
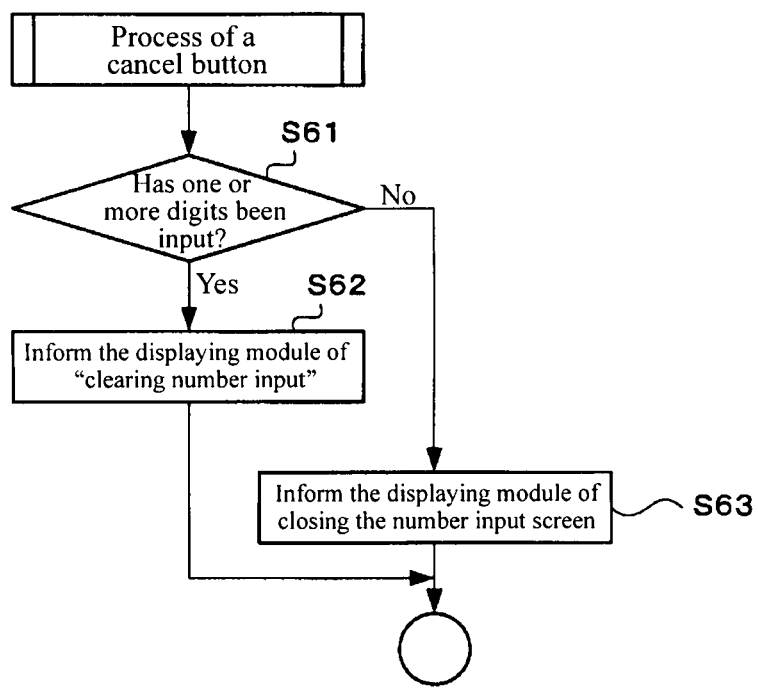
FIG. 13 is a flowchart illustrating a process example of a cancel button according to an embodiment of the present invention.

FIG. 13 is a view showing a process of the cancel button of step S26 in FIG. 9.

Herein, it is judged whether a number of one or more digits has been input (step S61), and if it has been input, the displaying module is informed of "clearing number input" (step S62). If it has not been input, the displaying module is informed of closing the number input screen (step S63).

Figure 14:
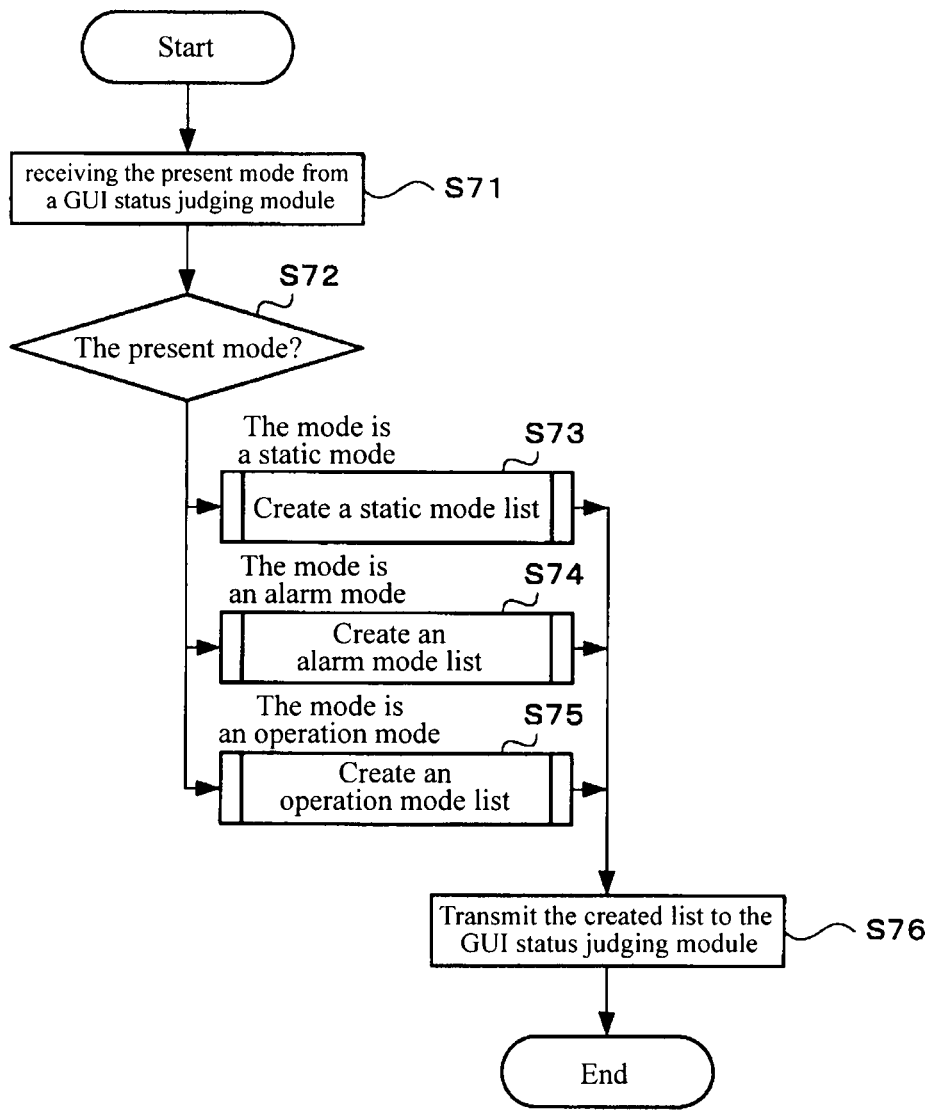
FIG. 14 is a flowchart illustrating a process example of creating a list based on a mode in a whole camera list order determining module according to an embodiment of the present invention.

FIG. 14 is a view illustrating a process example in the whole camera list order determining modules 104 and 202.

When the whole camera list order determining module receives a present mode from the GUI status judging module (step S71), determines the received mode (step S72), and performs a process for creating a static mode list if the received mode is a static (STATIC) mode (step S73). Also perform a process for creating an alarm mode list if it is an alarm mode (step S74). Moreover, perform a process for creating an operation mode list if it is an operation mode (operation history mode) (step S75).

Then, the mode list created respectively is transmitted to the GUI status judging module (step S76).

Figure 15:
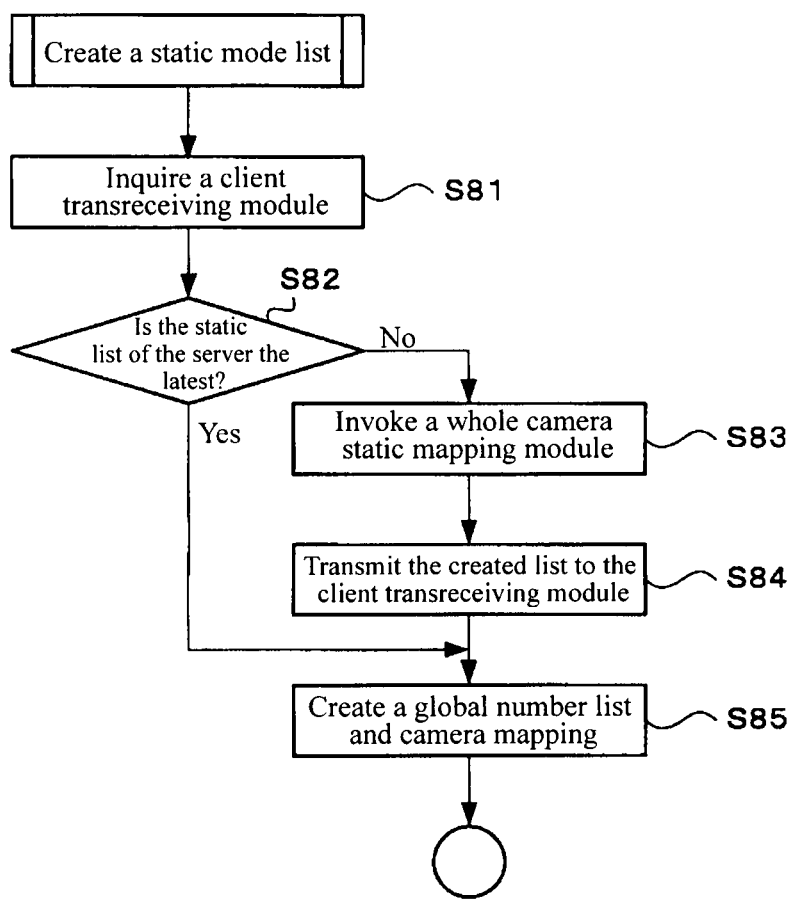
FIG. 15 is a flowchart illustrating a process example of creating a static mode list according to an embodiment of the present invention.

FIG. 15 is a view showing the process for creating a static mode list in step S73 in the flowchart of FIG. 14.

At this time, inquire the client transreceiving module (step S81), and judge whether the static list of the server is the latest (step S82), and if it is not the latest, invoke the whole camera static mapping module (step S83), and transmit the created list to the client transreceiving module (step S84).

Then, create a global number list and camera mapping (step S85).

Figure 16:
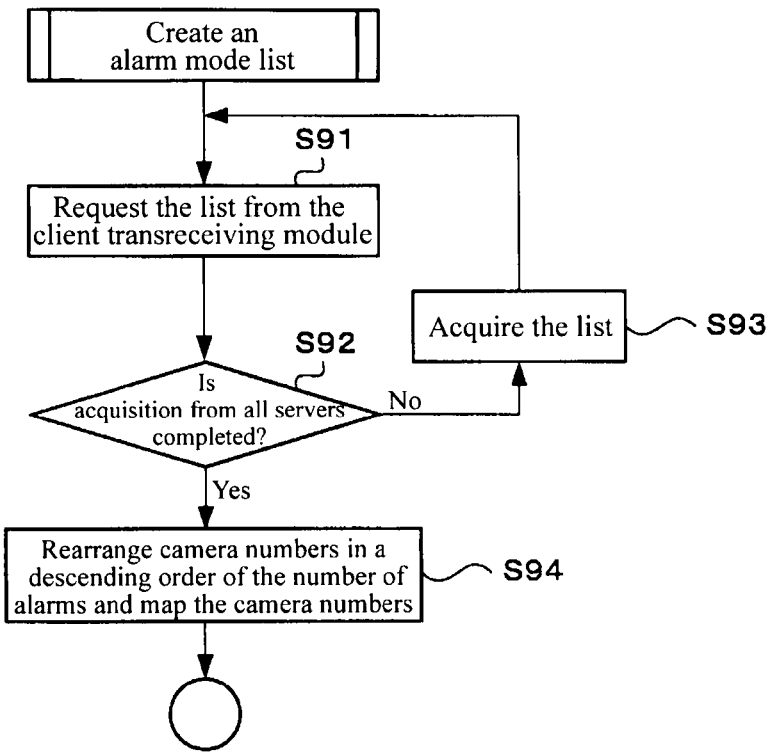
FIG. 16 is a flowchart illustrating a process example of creating an alarm mode list according to an embodiment of the present invention.

FIG. 16 is a view showing the process for creating an alarm mode list in step S74 in the flowchart of FIG. 14.

At this time, request the list from the client transreceiving module (step S91), and judge whether lists of all servers have been acquired (step S92). If the lists of all servers have not been acquired, acquire the lists (step S93) and return to step S91. If the lists of all servers have been acquired in step S92, the camera numbers are rearranged in a descending order of the number of alarms and mapped (step S94).

Figure 17:
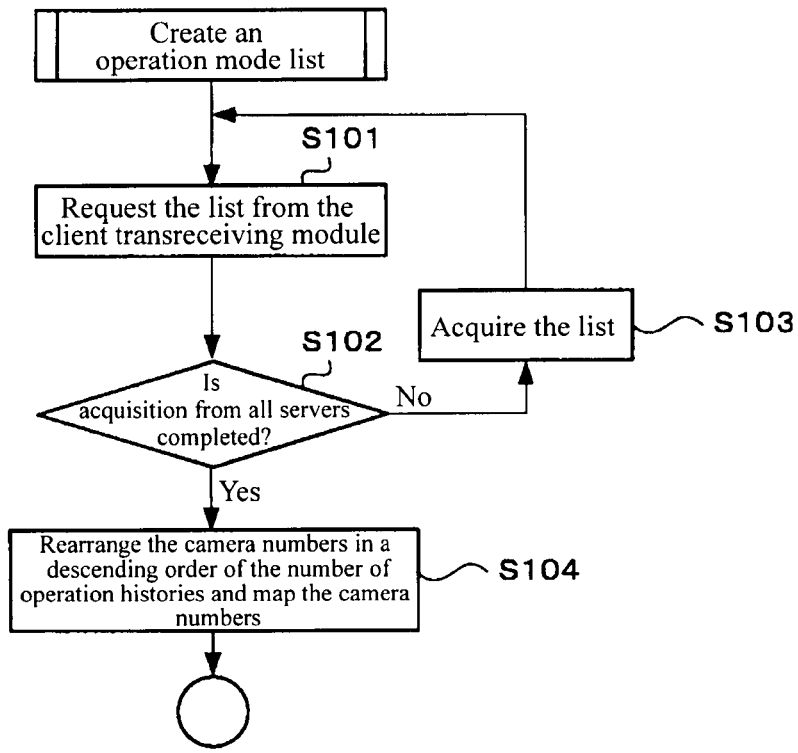
FIG. 17 is a flowchart illustrating a process example of creating an operation mode list according to an embodiment of the present invention.

FIG. 17 is a view showing the process for creating an operation mode list in step S75 in the flowchart of FIG. 14.

At this time, request the list from the client transreceiving module (step S101), and judge whether lists of all servers have been acquired (step S102). If the lists of all servers have not been acquired, acquire the lists (step S103) and return to step S101. If the lists of all servers have been acquired in step S102, the camera numbers are rearranged in a descending order of the number of operation histories and mapped (step S94).

Figure 18:
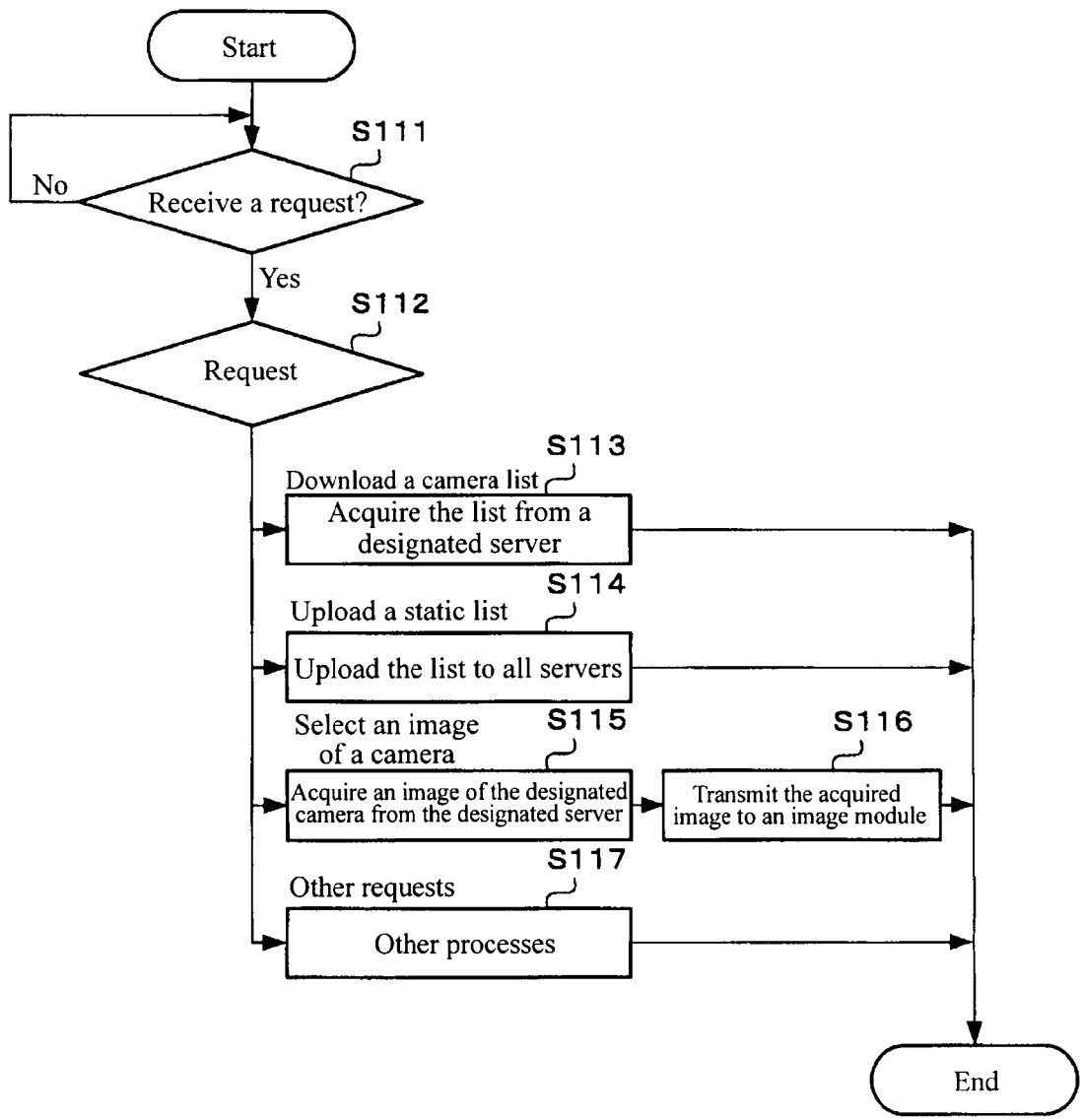
FIG. 18 is a flowchart illustrating a process example of receiving a request in a client transreceiving module according to an embodiment of the present invention.

FIG. 18 is a flowchart illustrating a process example in the client transreceiving module on the client side. It is judged whether a request is received by the client transreceiving module (step S111), and if the request is received, content of the request is judged (step S112). If the judged content of the request is to download a camera list, the list is acquired from a designated server (step S113). If the judged content of the request is to upload a static list, the list is uploaded to all servers (step S114). If the judged content of the request is to select an image of a camera, the image of the designated camera is acquired from a designated server (step S115), and the acquired image data is transmitted to an image module. If the judged content of the request is another request, another process corresponding to the request is performed (step S117).

Figure 19:
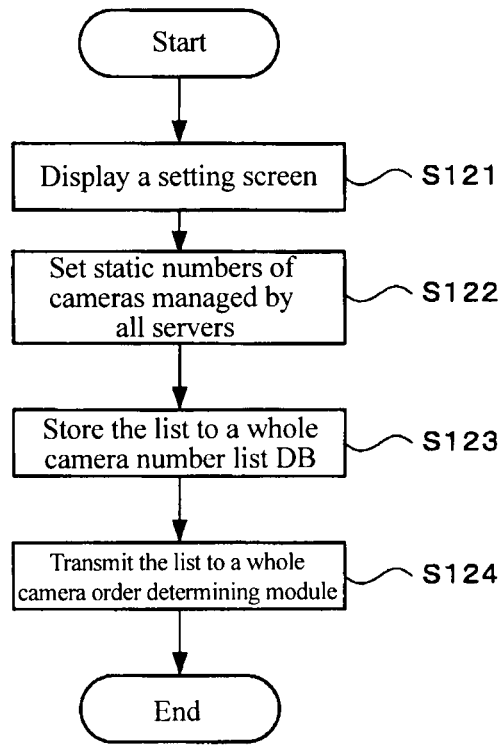
FIG. 19 is a flowchart illustrating a process example of displaying a setting screen in a whole camera static mapping module according to an embodiment of the present invention.

FIG. 19 is a view illustrating a process example of the whole camera static mapping module of the client. At first, display a setting screen as shown in FIG. 6 (step S121), and set static numbers of cameras managed by all servers (step S122), and store the set list in the whole camera number list database (step S123). Then, transmit the set list to the whole camera order determining module (step S124).

Figure 20:
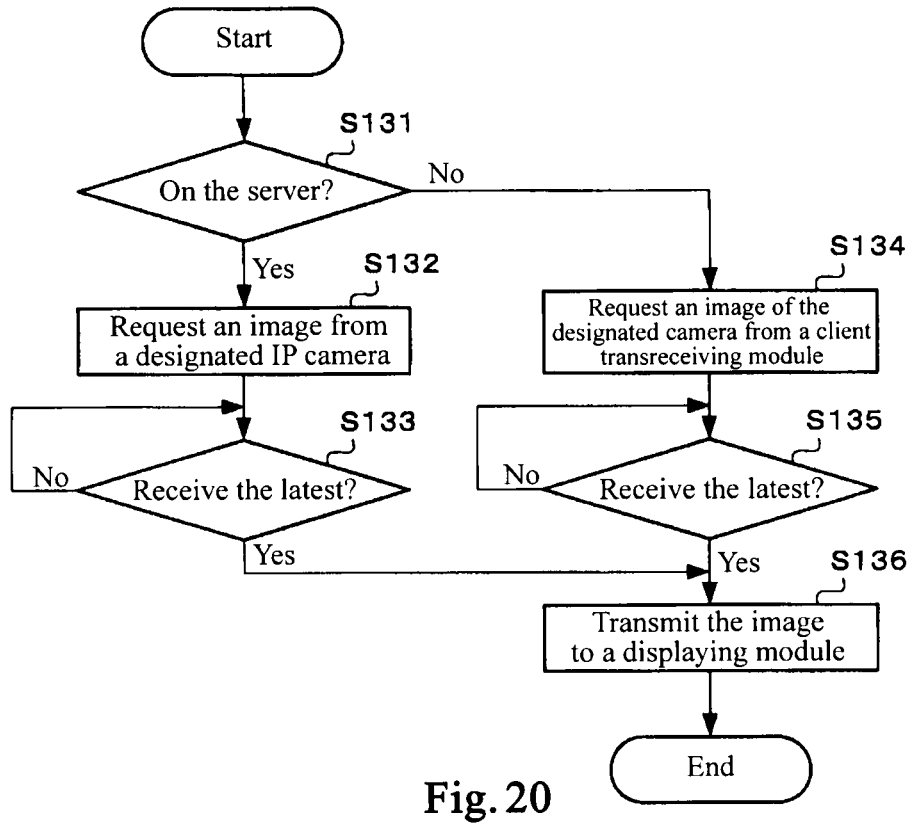
FIG. 20 is a flowchart illustrating a process example of receiving a request in an image receiving module according to an embodiment of the present invention.

FIG. 20 is a view illustrating a process example in the image acquiring module 111 of the server and the image acquiring module 208 of the client. If there is a request for acquiring an image of a camera, the image acquiring module judges whether the camera is managed by its server (step S131). If the camera is managed by the server, request the designated IP camera to transmit the image (step S132), and stand by until it can receive the latest image of the camera (step S133), and transmit the image to the displaying module when it can receive (step S136).

When it is judged that the camera is not a camera on the server in step S131, the image acquiring module requests the image of the designated camera from the client transreceiving module (step S134), and stands by until it can receive the latest image of the camera (step S135), and transmits the image to the displaying module when it can receive (step S136).

Figure 21:
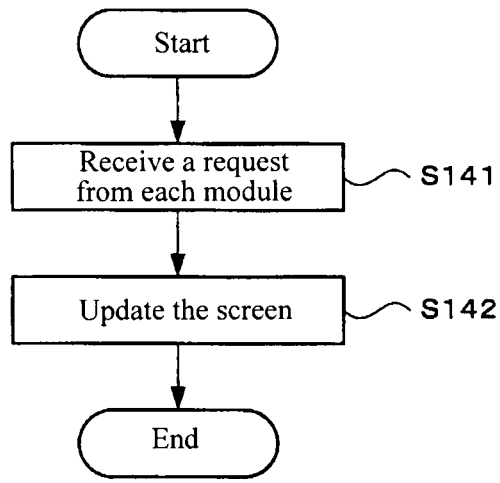
FIG. 21 is a flowchart illustrating a process example of receiving a request from each module according to an embodiment of the present invention.

FIG. 21 is a view illustrating a process example in the displaying module 112 of the server and the displaying module 207 of the client.

When each of the displaying modules receives a request for updating the display from other modules (step S141), a screen of a displaying unit displayed by the displaying module is updated to a corresponding state (step S142), and the process is ended.

Figure 22:
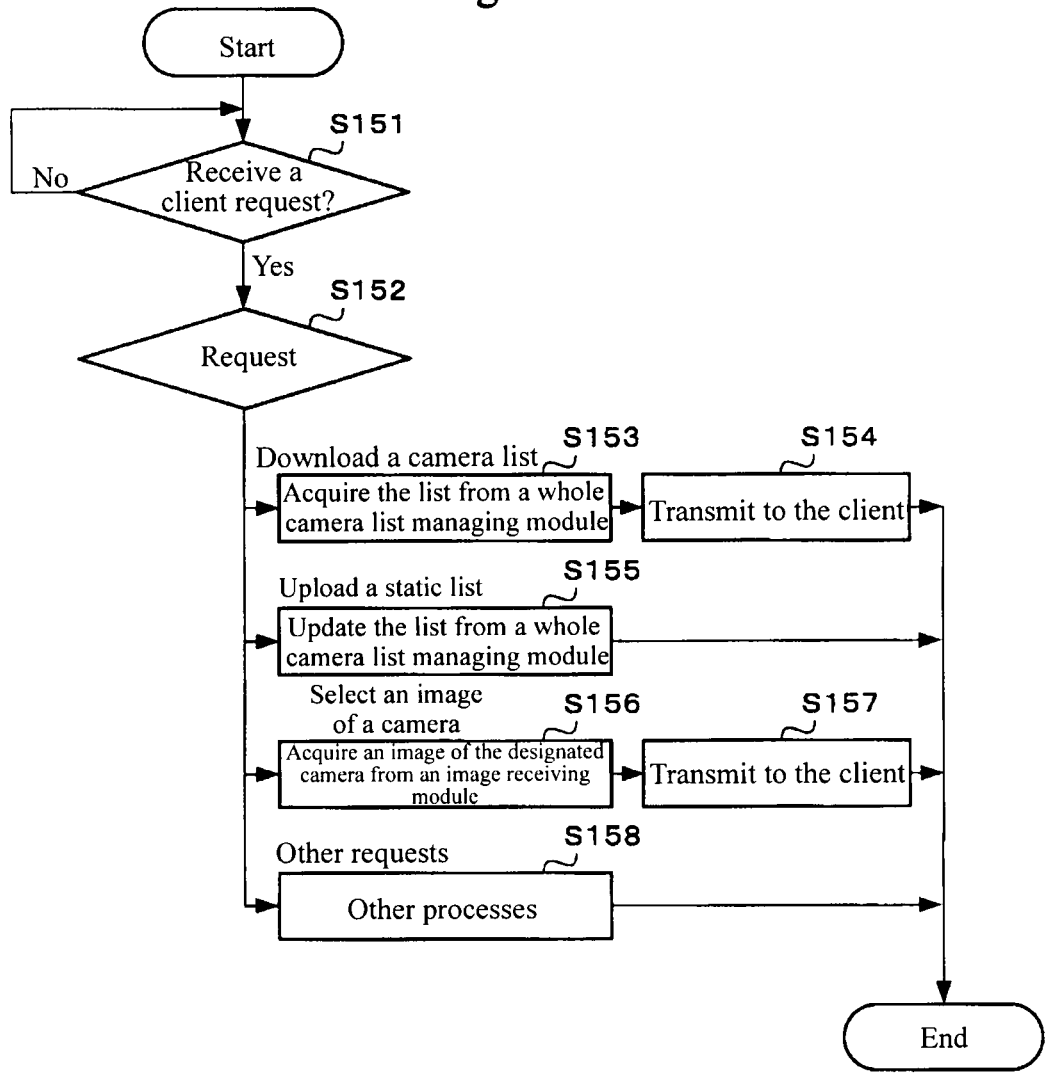
FIG. 22 is a flowchart illustrating a process example of receiving a request from the client in a server transreceiving module according to an embodiment of the present invention.

FIG. 22 is a view illustrating a process example in the server transreceiving module 101 of the server.

The server transreceiving module 101 judges whether a client request is received (step S151), and judges the content of the client request when it is received (step S152). If the judged content of the request is to download a camera list, the list is acquired from the whole camera list managing module (step S153), and is transmitted to the client (step S154).

Moreover, if the judged content of the request is to upload a static list, the list is acquired from the whole camera list managing module (step S155).

In addition, if the judged content of the request is to select an image of a camera, the image of the designated camera is acquired from the image receiving module (step S156), and is transmitted to the client (step S157).

Furthermore, if it is other requests, a process corresponding to the content of each request is performed (step S158).

Figure 23:
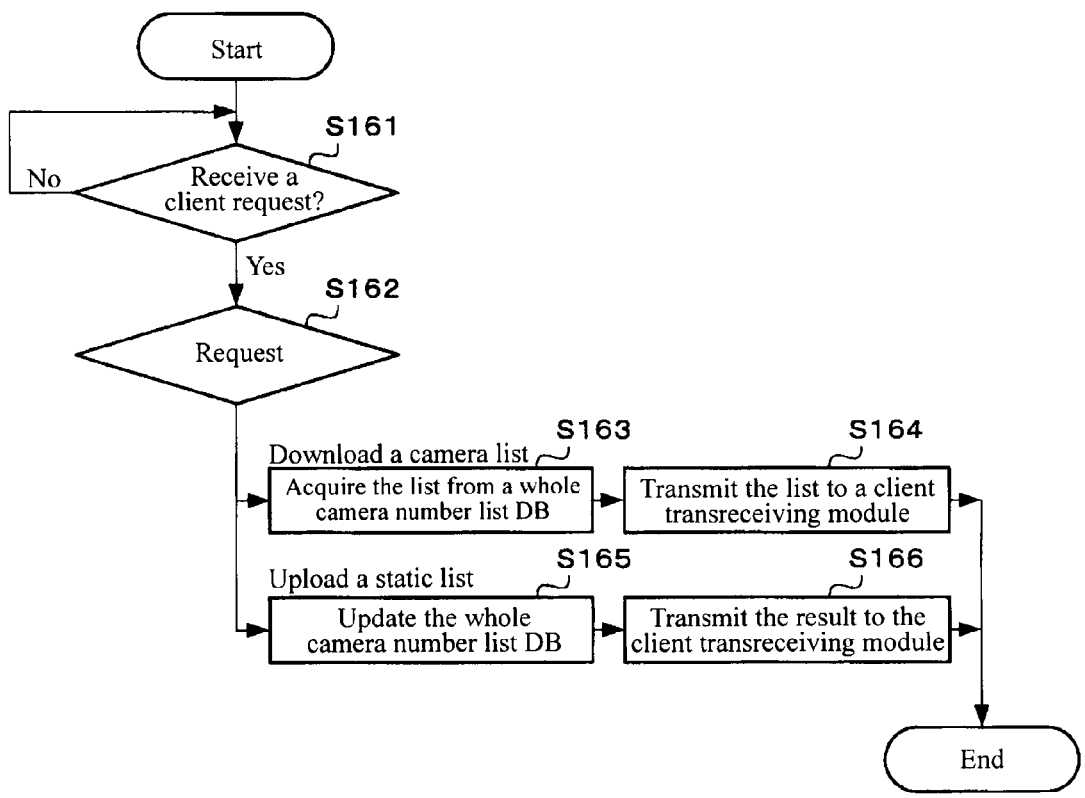
FIG. 23 is a flowchart illustrating a process example of receiving a request from the client in a whole camera list managing module according to an embodiment of the present invention.

FIG. 23 is a view illustrating a process example in the whole camera list managing module 102 of the server.

The whole camera list managing module 102 judges whether a request is received (step S161), and judges the content of the client request when the client request is received (step S162). If the judged content of the request is to download a camera list, the list is acquired from a database of the whole camera number list (step S163), and the list is transmitted to the client transreceiving module (step S164).

Moreover, if the judged content of the request is to upload a static list, update the database of the whole camera number list (step S165), and transmit a result to the client transreceiving module (step S166).

Figure 24:
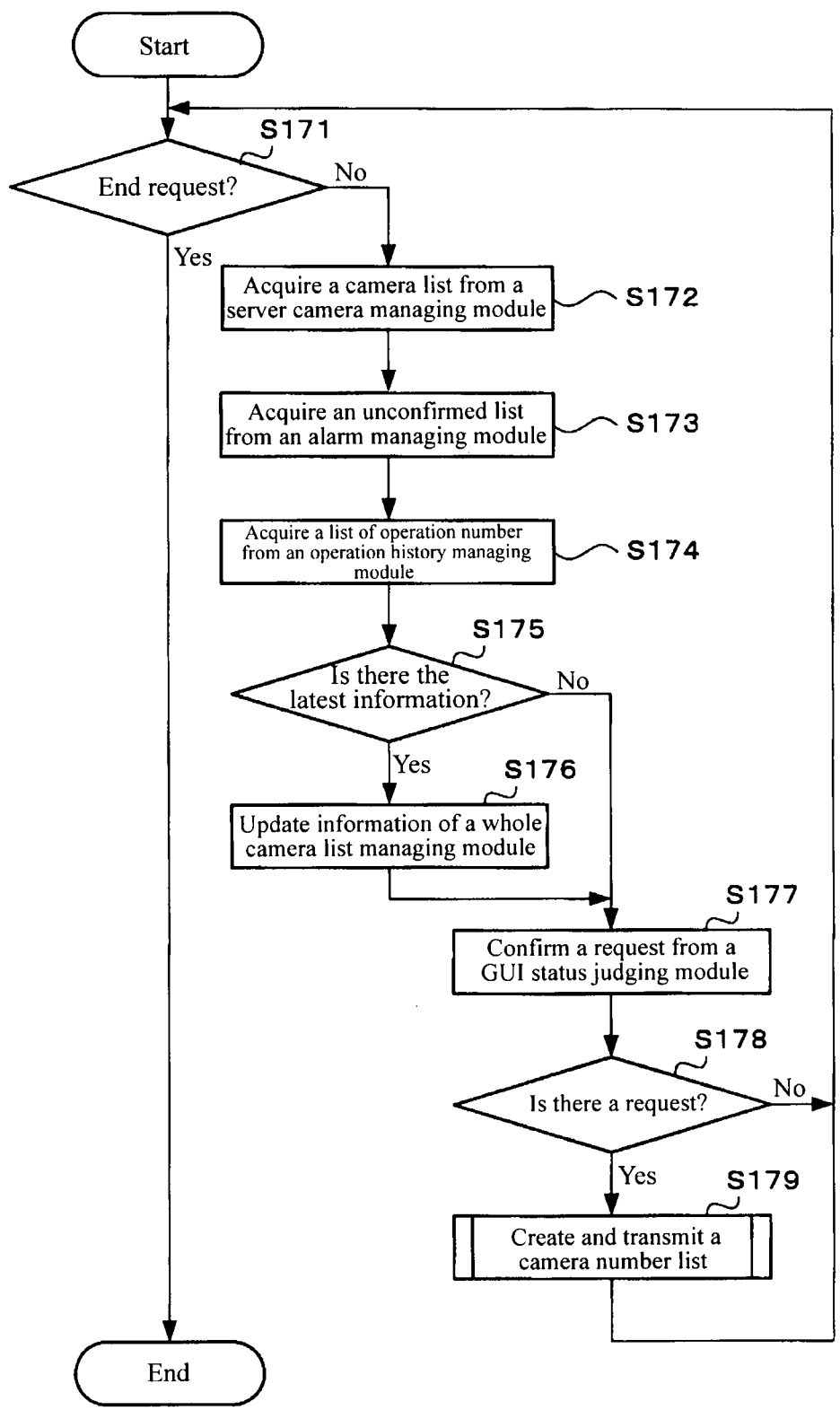
FIG. 24 is a flowchart illustrating a process example of acquiring a list in a camera list order determining module according to an embodiment of the present invention.

FIG. 24 is a view illustrating a process example in the camera list order determining module 104 of the server.

The camera list order determining module 104 judges whether there is an end request (step S171), and acquires a camera list from the server camera managing module if there is not an end request (step S172). Then, acquire an unconfirmed list from the alarm managing module (step S173), and acquire a list of operation number from the operation history managing module (step S174).

Then, judge whether there is the latest information (step S175), and update information of the whole camera list managing module if there is the latest information (step S176). Then, confirm a request from the GUI status judging module (step S177), and judge whether the request exists (step S178), and create and transmit a camera number list if the request exists (step S179).

Figure 25:
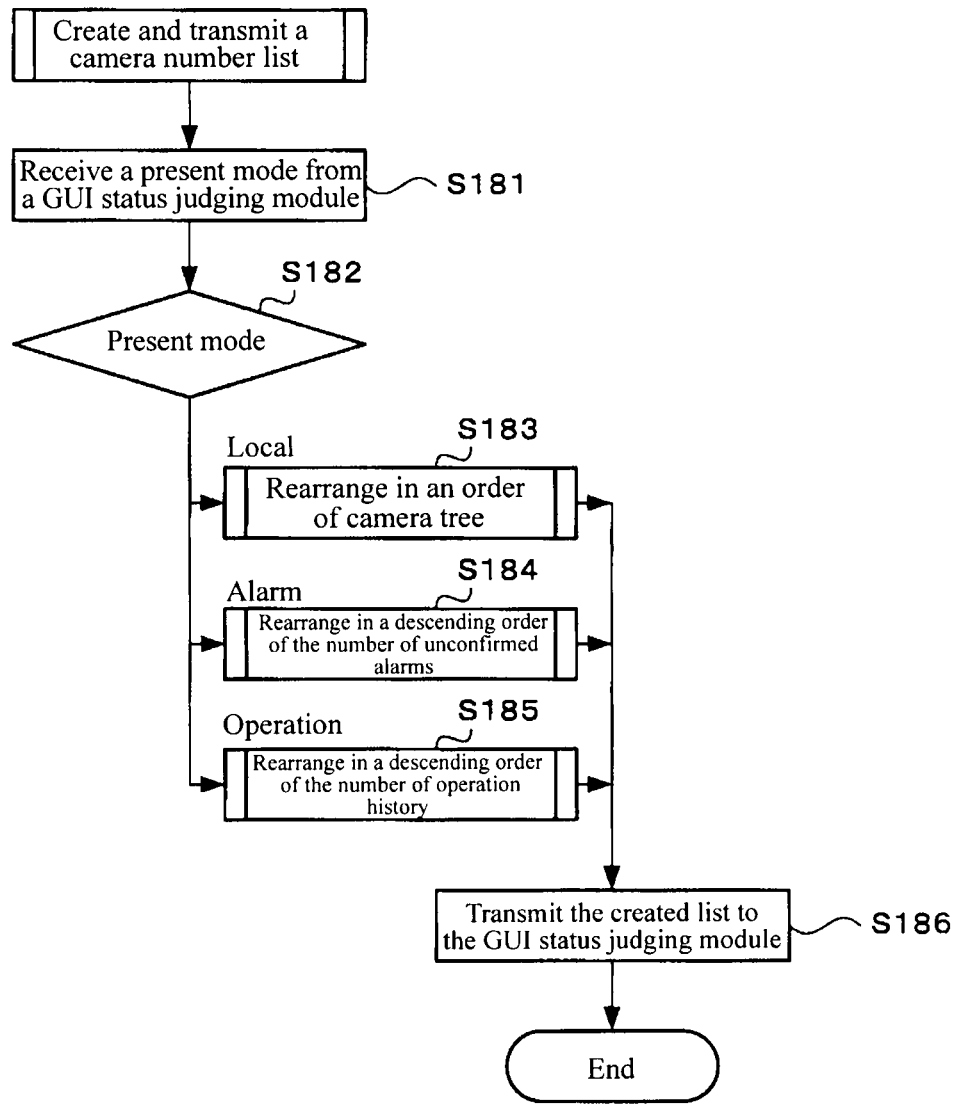
FIG. 25 is a flowchart illustrating a process example of creating and transmitting a camera number list according to an embodiment of the present invention.

FIG. 25 is a flowchart showing a process example of creating and transmitting the camera number list in step S179 in the flowchart of FIG. 24.

The process herein is to receive a present mode from the GUI status judging module (step S181), and to judge the mode (step S182).

If the judged mode is a local mode, the camera number list is rearranged in an order of the camera tree (step S183).

In addition, if the judged mode is an alarm mode, the camera number list is rearranged in a descending order of the number of unconfirmed alarms (step S184).

Moreover, if the judged mode is an operation mode, the camera number list is rearranged in a descending order of the number of operation history (step S185).

And then, the created list is transmitted to the GUI status judging module (step S186).

Figure 26:
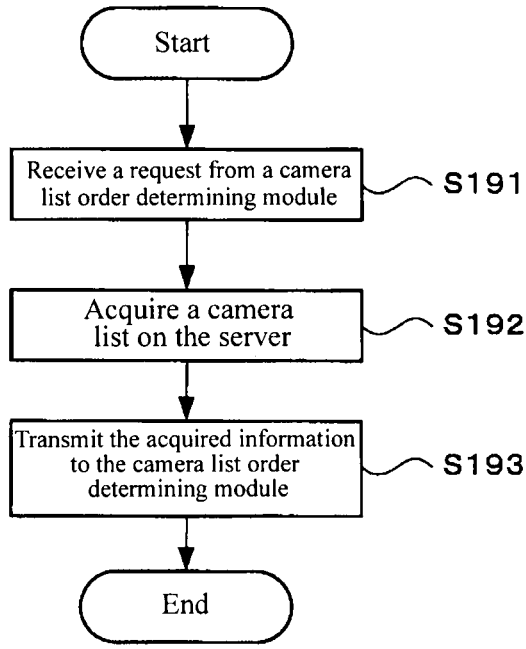
FIG. 26 is a flowchart illustrating a process example of receiving a request from the camera list order determining module in a server camera managing module according to an embodiment of the present invention.

FIG. 26 is a flowchart illustrating a process example of the rearrangement, as shown in step S183 in the flowchart of FIG. 25, in the server camera managing module.

When a request is received from the camera list order determining module (step S191), the server camera managing module acquires a camera list on the server (step S192), and transmits the acquired information to the camera list order determining module (step S193).

Figure 27:
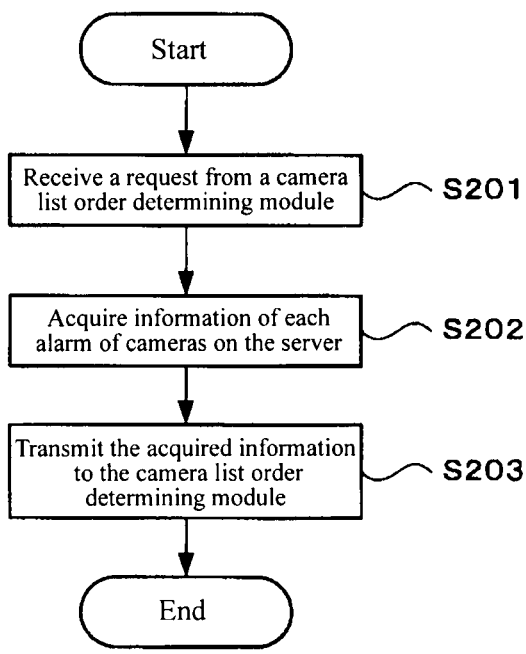
FIG. 27 is a flowchart illustrating a process example of receiving a request from the camera list order determining module in an alarm managing module according to an embodiment of the present invention.

FIG. 27 is a flowchart illustrating a process example of the rearrangement, as shown in step S184 in the flowchart of FIG. 25, in the alarm managing module.

When a request is received from the camera list order determining module (step S201), the alarm managing module acquires information of each alarm of cameras on the server (step S202), and transmits the acquired information to the camera list order determining module (step S203).

Figure 28:
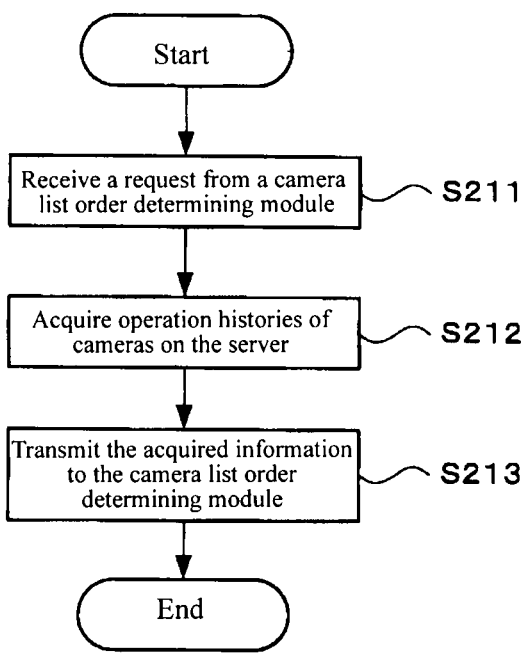
FIG. 28 is a flowchart illustrating a process example of receiving a request from the camera list order determining module in an operation history managing module according to an embodiment of the present invention.

FIG. 28 is a flowchart illustrating a process example of the rearrangement, as shown in step S185 in the flowchart of FIG. 25, in the operation history managing module.

When a request is received from the camera list order determining module (step S211), the operation history managing module acquires operation histories of cameras on the server (step S212), and transmits the acquired information to the camera list order determining module (step S213).

Hereinafter, a practical action example with the system structure described above will be described.

Firstly, an action example in the case of designating a global camera number on the client side and selecting an IP camera will be described in that order.

1-1) A user presses a camera selection button of a special remote controller.

1-2) A code, which can identify that the camera selection button is pressed, is received by a "remote controller operation judging module".

1-3) The "remote controller operation judging module" informs a "GUI status judging module" that the camera selection button is pressed.

1-4) It is judged by the "GUI status judging module" whether the camera selection button is pressed continuously or is pressed for the first time.

1-5) When it is judged by the "GUI status judging module" that the camera selection button is pressed for the first time, it becomes a static camera selection mode, and "SATATIC.---" and a number input screen are displayed on the screen.

1-6) If the user inputs a camera number by the special remote controller, the "GUI status judging module" receives a three-digits number through the "remote controller operation judging module", and inquires a "whole camera list order determining module" on a client side about which one of the IP cameras managed by all servers is the IP camera corresponding to the number in the present mode.

1-7) The "whole camera list order determining module" of the client informs a "whole camera list managing module" at a server, which is successfully accessed at the very beginning, via a "client transreceiving module" and a "server transreceiving module" of receiving the camera number in a static mode, receives a present global camera number mapping therefrom, and determines which IP camera corresponds to the number pressed by the user.

In addition, if the mapping has not been created on the server herein, a mapping creating screen of a "whole camera static mapping module" is invoked in order to create the global camera number mapping.

1-8) The "whole camera list order determining module" of the client informs the "client transreceiving module" of receiving an image of an IP camera corresponding to the number selected by the user, and then informs the "GUI status judging module" that receiving started successfully.

1-9) The "GUI status judging module" informs a "displaying module" of changing the camera selection status if an IP camera display box, in which the IP camera has already been selected, exists in the present layout. If the IP camera does not exist in the layout, search for the corresponding IP camera from several layouts created by the user himself, and inform the "displaying module" of changing the layout and camera selection status when finding out the IP camera.

If the corresponding IP camera does not exist in the layout created by the user himself, inform the "displaying module" of newly and temporarily creating a layout which only displays the IP camera and displaying the layout.

1-10) The "displaying module" sets the IP camera selected by the user into a selected state based on information from the "GUI status judging module" and displays the IP camera on the screen. Moreover, a number of the selected IP camera is displayed on the number input screen. The camera selection on the camera tree is also changed.

1-11) The number input screen disappears and the selection is ended when the user presses the camera selection button again.

Next, an action example of selecting an IP camera with many unconfirmed alarms will be described.

2-1) The user presses the "SELECT CAMERA" button of the special remote controller in the state of a static camera selection mode.

2-2) When it is judged by the "GUI status judging module" that the camera selection button is pressed for the second time, it becomes an alarm camera selection mode, and "ALARM. - - -" and a number input screen are displayed on the screen.

2-3) If the user inputs a camera number by the special remote controller, the "GUI status judging module" receives a three-digits number through the "remote controller operation judging module", and inquires a "whole camera list order determining module" on a client side about which one of IP cameras managed by all servers is the IP camera corresponding to the number in the present mode.

2-4) The "whole camera list order determining module" on the client side informs a "whole camera list managing module" at each server connected to the client, via a "client transreceiving module" and a "server transreceiving module", of receiving the camera number in an alarm mode.

2-5) The "whole camera list managing module" of the server extracts the number of unconfirmed alarms of each IP camera on the server from an "alarm managing module" via the "camera list order determining module", and reflects the information in a camera number mapping.

2-6) The "whole camera list order determining module" of the client confirms the number of unconfirmed alarms of each IP camera of the server managed by the present client, and determines which number of the remote controller each IP camera is corresponding to.

2-7) The "whole camera list order determining module" of the client informs the "client transreceiving module" of receiving an image of an IP camera corresponding to the number selected by the user, and then informs the "GUI status judging module" that receiving started successfully.

2-8) The "GUI status judging module" informs a "displaying module" of changing the camera selection status if an IP camera display box, in which the IP camera has already been selected, exists in the present layout. If the IP camera does not exist in the layout, search for the corresponding IP camera from several layouts created by the user himself, and inform the "displaying module" of changing the layout and camera selection status when finding out the IP camera.

If the corresponding IP camera does not exist in the layout created by the user himself, inform the "displaying module" of newly and temporarily creating a layout which only displays the IP camera and displaying the layout.

2-9) The "displaying module" sets the IP camera selected by the user into a selected state based on information from the "GUI status judging module" and displays the IP camera on the screen. Moreover, a number of the selected IP camera is displayed on the number input screen. In the case of the server, a local number and a global number corresponding to the designated number will also be displayed if they exist, and in the case of the client, a global number corresponding to the designated ranking number will also be displayed if it exists. The camera selection on the camera tree is also changed.

2-10) The number input screen disappears and the selection is ended when the user presses the camera selection button again.

Next, an action example of selecting an IP camera with many operation histories will be described.

3-1) The user presses the camera selection button of the special remote controller in the state of an alarm camera selection mode.

3-2) When it is judged by the "GUI status judging module" that the camera selection button is pressed for the third time, it becomes an OPERATION camera selection mode, and "OPERATION. - - -" and a number input screen are displayed on the screen.

3-3) If the user inputs a camera number by the special remote controller, the "GUI status judging module" receives a three-digits number through the "remote controller operation judging module", and inquires a "whole camera list order determining module" on a client side about which one of IP cameras managed by all servers is the IP camera corresponding to the number in the present mode.

3-4) The "whole camera list order determining module" on the client side informs a "whole camera list managing module" at each server connected to the client, via a "client transreceiving module" and a "server transreceiving module", of receiving the camera number in an OPERATION mode.

3-5) The "whole camera list managing module" extracts the number of operations of each IP camera on the server from an "operation history managing module" via the "camera list order determining module", and reflects the information in a camera number mapping.

3-6) The "whole camera list order determining module" of the client confirms the number of operations of each IP camera of the server managed by the present client, and determines which number of the remote controller each IP camera is corresponding to.

3-7) The "whole camera list order determining module" of the client informs the "client transreceiving module" of receiving an image of an IP camera corresponding to the number selected by the user, and then informs the "GUI status judging module" that receiving started successfully.

3-8) The "GUI status judging module" determines an order of camera numbers from the received information. Then, inform a "displaying module" of changing the camera selection status if an IP camera display box, in which the IP camera has already been selected, exists in the present layout. If the IP camera does not exist in the layout, search for the corresponding IP camera from several layouts created by the user himself, and inform the "displaying module" of changing the layout and camera selection status when finding out the IP camera.

If the corresponding IP camera does not exist in the layout created by the user himself, inform the "displaying module" of newly and temporarily creating a layout which only displays the IP camera and displaying the layout.

3-9) The "displaying module" sets the IP camera selected by the user into a selected state based on information from the "GUI status judging module" and displays the IP camera on the screen. Moreover, a number of the selected IP camera is displayed on the number input screen. In the case of the server, a local number and a global number corresponding to the designated number will also be displayed if they exist, and in the case of the client, a global number corresponding to the designated ranking number will also be displayed if it exists. The camera selection on the camera tree is also changed.

3-10) The number input screen disappears and the selection is ended when the user presses the camera selection button again.

Next, an action example in the case of selecting an IP camera in a state that there is a static camera number mapping in the server will be described.

4-1) A user presses a camera selection button of a special remote controller.

4-2) A code, which can identify that the camera selection button is pressed, is received by a "remote controller operation judging module".

4-3) The "remote controller operation judging module" informs a "GUI status judging module" that the camera selection button is pressed.

4-4) It is judged by the "GUI status judging module" whether the camera selection button is pressed continuously or is pressed for the first time.

4-5) When it is judged by the "GUI status judging module" that the camera selection button is pressed for the first time, it becomes a static camera selection mode, and "SATATIC.---" and a number input screen are displayed on the screen.

4-6) If the user inputs a camera number by the special remote controller, the "GUI status judging module" receives a three-digits number through a "remote controller operation judging module", and inquires a "camera list order determining module" on a client side about which one of IP cameras managed by all servers is the IP camera corresponding to the number in the present mode.

4-7) The "camera list order determining module" on the server receives a global camera number from a "whole camera list managing module", and determines the selected camera number based on the information.

4-8) The "GUI status judging module" determines an order of camera numbers from the received information. Then, inform a "displaying module" of changing the camera selection status if an IP camera display box, in which the IP camera has already been selected, exists in the present layout. If the IP camera does not exist in the layout, search for the corresponding IP camera from several layouts created by the user himself, and inform the "displaying module" of changing the layout and camera selection status when finding out the IP camera.

If the corresponding IP camera does not exist in the layout created by the user himself, inform the "displaying module" of newly and temporarily creating a layout which only displays the IP camera and displaying the layout.

4-9) The "displaying module" sets the IP camera selected by the user into a selected state based on information from the "GUI status judging module" and displays the IP camera on the screen. Moreover, a number of the selected IP camera is displayed on the number input screen. In the case of the server, a local number and a global number corresponding to the designated number will also be displayed, and in the case of the client, a global number will also be displayed. The camera selection on the camera tree is also changed.

4-10) The number input screen disappears and the selection is ended when the user presses the camera selection button again.

According to a system of the present embodiment as described above, an IP camera can be designated simply and directly without depending on a server by using a client and a plurality of servers capable of managing a plurality of IP cameras. That is, no matter which server an IP camera is managed by, a process such as displaying an image of a camera can be performed by operating an operation button of a special remote controller, operating a key of a terminal on the client side, or the like, operation process such as camera assignment can be intuitively conveyed to a user, and an effect that a large-scale camera system can be managed simply is achieved.

Moreover, camera numbers of the special remote controller can be dynamically assigned and static camera numbers can be assigned in an order from a high priority for a user, i.e. an operator, and thus, an IP camera with a high priority can be selected by designating a number of the special remote controller before the user confirms states of these IP cameras himself.

For example, without steps of selecting each server from a controller managing dozens of servers, each of which manages dozens of cameras, and confirming all the alarms of each of the IP cameras managed by the servers respectively, an IP camera with many unconfirmed alarms can be listed in a camera tree no matter which server the IP camera belongs to, and all IP cameras with unconfirmed alarms can be simply operated in a state that the IP cameras are mapped dynamically into camera numbers of the special controller in an order from the IP camera with most unconfirmed alarms.

Furthermore, global camera numbers can be manually assigned to all IP cameras of all servers regardless of above-mentioned priority order by switching a mapping mode, and thus, an IP camera can be selected by using a local camera number on the server or using a static global camera number on the client after statically mapping all camera numbers. In addition, the local number and the global number are displayed in a state that the correlation therebetween is known on the server, and thus, both a person monitoring on the server and a person monitoring on the spot by using a client can identify an identical IP camera by the same number at the same time.

Specifically, an administrator, no matter on a server or on a client does he confirm a camera with many unconfirmed alarms in an unconfirmed alarm ranking mode, informs other surveillants of a global number thereof immediately, and the two can share and select the same camera simply even in a system in which there are many cameras in total.

In addition, the system structure, as described in FIG. 1, etc, of the above-mentioned embodiment only indicates an example of the structure, and is not limited to the structures shown in the figures. Moreover, an inner structure of a server and that of a client, as shown in FIG. 4, etc, only indicate a structure viewed from respective functions. For example, when the server and the client are computer apparatuses, they may be configured by installing programs (software) for executing each of the functions by calculating process provided in the computer apparatus.

What is claimed is:

1. A network camera management system for managing a plurality of cameras connected to a predetermined network, comprising:

a plurality of servers, each of the servers managing at least one of the plurality of cameras and controlling recording and displaying of images captured by the at least one of the plurality of cameras;

a client that manages the plurality of servers; and a controller that instructs a management state of the plurality of cameras and selects a mode of the client from a plurality of display modes;

wherein the servers or the client include an alarm manager that manages an alarm from each of the cameras or an alarm based on an image captured by the cameras, and the controller displays on a display screen, in response to an operation of the controller to select an alarm mode from the plurality of display modes, the images and the plurality of cameras in an order based on a list of cameras having unconfirmed alarm history, the unconfirmed alarm history indicating that an alarm has occurred in a corresponding camera and images relating to the alarm have not been displayed.

2. The network camera management system according to claim 1, wherein the controller connects with the client and controls the plurality of cameras including the cameras managed by each of the servers.

3. The network camera management system according to claim 2, wherein the client or one of the servers connected to the network serves as global address assigner for the plurality of cameras and allocates an address in a discretionary order regardless of a server managing each of the cameras.

4. The network camera management system according to claim 3, wherein the mode instructed by the controller includes a mode for displaying the plurality of cameras in an order based on an address assigned by the global address assigner.

5. The network camera management system according to claim 3, wherein,
the servers and the client include an operation history manager that manages an operation history of each of the cameras, and
the mode instructed by the controller includes a mode for displaying the images and plurality of cameras in an order based on operation histories managed by the operation history manager.

6. The network camera management system according to claim 3, further including at least two clients, wherein a client used as the global address assigner is different from a client connected with the controller.

7. A network camera management method for managing a plurality of cameras connected to a predetermined network, comprising:
managing, at each of a plurality of servers connected to the predetermined network, at least one of the plurality of cameras and controlling, at each of the plurality of servers connected to the predetermined network, recording and displaying of images captured by the at least one of the plurality of cameras;
managing, at a client, the plurality of servers;
instructing, via a controller, a management state of the plurality of cameras; and
selecting, via the controller, a mode of the client from a plurality of display modes,
wherein
the servers or the client include an alarm manager that manages an alarm from each of the cameras or an alarm based on an image captured by the cameras, and
the controller displays on a display screen, in response to an operation of the controller to select an alarm mode from the plurality of display modes, the images and the plurality of cameras in an order based on a list of cameras having unconfirmed alarm history, the unconfirmed alarm history indicating that an alarm has occurred in a corresponding camera and images relating to the alarm have not been displayed.

8. The network camera management system according to claim 7, wherein the list of cameras is displayed in an order based on an earliest unconfirmed alarm or a latest unconfirmed alarm.

* * * * *